United States Patent
Shattil

(10) Patent No.: US 7,406,261 B2
(45) Date of Patent: *Jul. 29, 2008

(54) UNIFIED MULTI-CARRIER FRAMEWORK FOR MULTIPLE-ACCESS TECHNOLOGIES

(75) Inventor: Steve J Shattil, Boulder, CO (US)

(73) Assignee: Lot 41 Acquisition Foundation, LLC, Wilmington, DE (US)

( * ) Notice: Subject to any disclaimer, the term of this patent is extended or adjusted under 35 U.S.C. 154(b) by 581 days.

This patent is subject to a terminal disclaimer.

(21) Appl. No.: 10/360,346

(22) Filed: Feb. 7, 2003

(65) Prior Publication Data

US 2003/0147655 A1    Aug. 7, 2003

Related U.S. Application Data

(63) Continuation-in-part of application No. 09/703,202, filed on Oct. 31, 2000, now Pat. No. 7,076,168.

(60) Provisional application No. 60/163,141, filed on Nov. 2, 1999.

(51) Int. Cl.
    *H04J 14/00*   (2006.01)
(52) U.S. Cl. .......................... 398/76; 398/78; 398/182; 398/202
(58) Field of Classification Search ................... 398/76, 398/78, 115, 77, 89, 99, 182, 202, 211
    See application file for complete search history.

(56) References Cited

U.S. PATENT DOCUMENTS

| | | | |
|---|---|---|---|
| 4,590,511 A | 5/1986 | Bocchi et al. | |
| 4,628,517 A | 12/1986 | Schwarz et al. | |
| 4,827,480 A | 5/1989 | Kowalski | |
| 5,003,545 A | 3/1991 | Kowalski | |
| 5,309,514 A | 5/1994 | Johnson et al. | |
| 5,463,376 A | 10/1995 | Stoffer | |
| 5,519,692 A | 5/1996 | Hershey et al. | |
| 5,521,937 A | 5/1996 | Kondo et al. | |
| 5,528,581 A | 6/1996 | De Bot | |
| 5,563,906 A | 10/1996 | Hershey et al. | |
| 5,790,516 A * | 8/1998 | Gudmundson et al. | 370/210 |

(Continued)

OTHER PUBLICATIONS

Xu, W., et al. "On the Performance of Multicarrier RAKE Systems", IEEE 1997, Mar. 11, 1997, pp 295-299.

(Continued)

*Primary Examiner*—Christina Y. Leung
(74) *Attorney, Agent, or Firm*—Connolly Bove Lodge & Hutz LLP

(57) ABSTRACT

A wireless communication system transmits data on multiple carriers simultaneously to provide frequency diversity. Orthogonality is provided by carrier interference, which causes a narrow pulse in the time domain corresponding to each transmitted data symbol. Selection of the frequency separation and phases of the carriers controls the timing of the pulses. Equivalently, pulse waveforms may be generated from an appropriate selection of polyphase sub-carrier codes. Time division of the pulses and frequency division of the carriers may be employed for multiple access. Received signals are processed by combining frequency-domain components corresponding to a desired user's allocated carriers. Individual data symbols are processed by providing polyphase decoding, matched filtering, or time-domain shifting the received carriers. Carrier Interferometry components may be used to build various signals corresponding to other transmission protocols.

24 Claims, 14 Drawing Sheets

U.S. PATENT DOCUMENTS

| | | | |
|---|---|---|---|
| 5,828,658 | A | 10/1998 | Ottersten et al. |
| 5,960,032 | A | 9/1999 | Letaief et al. |
| 6,097,712 | A | 8/2000 | Secord et al. |
| 6,211,671 | B1 | 4/2001 | Shattil |
| 6,686,879 | B2 * | 2/2004 | Shattil .................. 342/367 |

OTHER PUBLICATIONS

Weerackody, V., "Diversity for the Direct-Sequence Spread-Spectrum System Using Multiple Transmit Antennas", IEEE 1993, May 23, 1993, pp 1775-1779.

Natarajan, B., et al. "High-Performance MC-CDMA via Carrier Interferometry Codes", IEEE Trans. Veh. Tech., Sep., 1999.

Natarajan, B., et al. "Exploiting Frequency Diversity in TDMA through Carrier Interferometry", Proc. Wireless 2000, Jul. 10-12, 2000, vol. 2, pp. 10-12.

Nassar, C., et al. "Introduction of Carrier Interference to Spread Spectrum Multiple Access", Proc. IEEE Emerg. Tech. Symp. Wireless Comm., Dallas, TX, Apr. 12-13, 1999.

B. Natarajan, C.R. Nassar, S. Shattil, M. Michelini, and Z. Wu, "High-Performance MC-CDMA Via Carrier Interferometry Codes," IEEE Trans. on Vehicular Technology, vol. 50, No. 6, pp. 1344-1353, Nov. 2001.

* cited by examiner

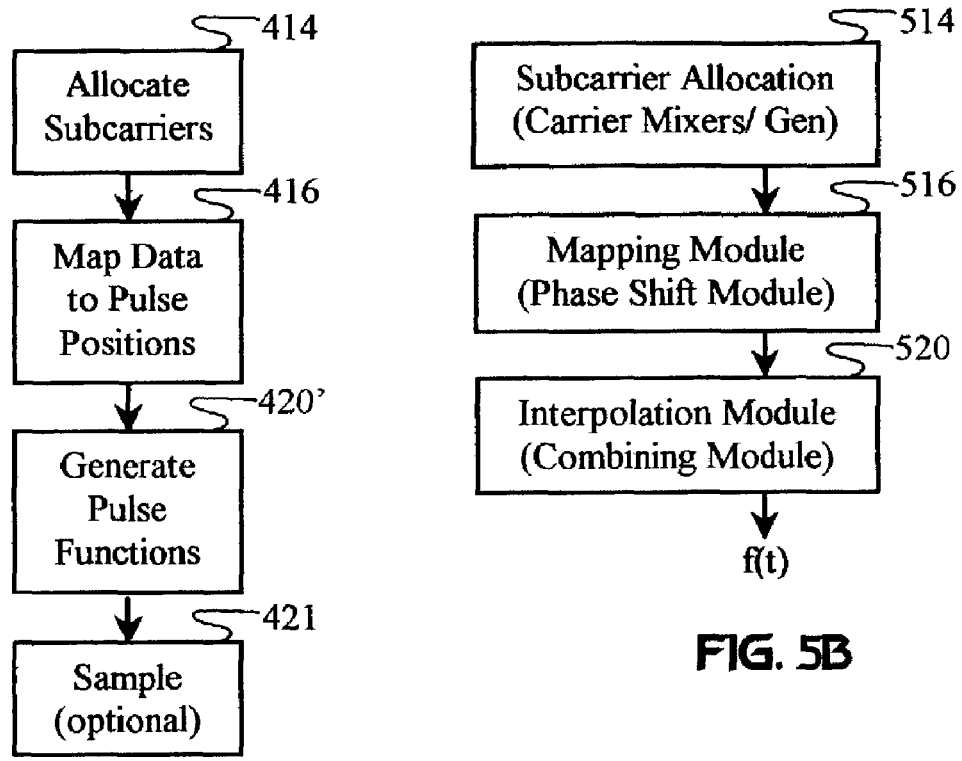
FIG. 5A
FIG. 5B
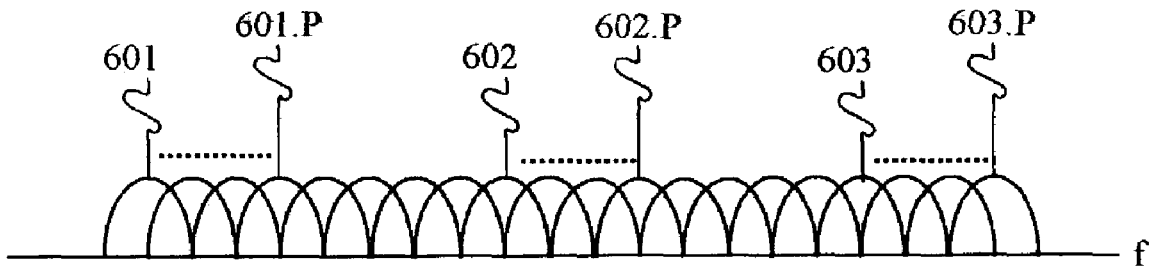
FIG. 6

US 7,406,261 B2

UNIFIED MULTI-CARRIER FRAMEWORK FOR MULTIPLE-ACCESS TECHNOLOGIES

This patent application is a continuation-in-part of patent application Ser. No. 09/703,202, filed Oct. 31, 2000, now U.S. Pat. No. 7,076,168, issue date Nov. 7, 2006 which is a non-provisional of Provisional Patent Application No. 60/163,141, filed Nov. 2, 1999.

FIELD OF THE INVENTION

The present invention relates to a novel multicarrier spread-spectrum protocol for wireless and waveguide communications.

BACKGROUND OF THE INVENTION

Orthogonal Frequency Division Multiplexing (OFDM) has a high spectral efficiency (the spectrum of the subcarriers overlap) and combats frequency-selective fading. However, the amplitude of each carrier is affected by the Rayleigh law, hence flat fading occurs. Therefore, good channel estimation with an appropriate detection algorithm and channel coding is essential to compensate for fading.

The performance of OFDM frequency diversity is comparable to the performance of an optimal direct-sequence CDMA (DS-CDMA) system's multipath diversity (which requires a Rake receiver). Because diversity is inherent in OFDM, it is much simpler to achieve than in an optimal DS-CDMA system. An OFDM system benefits from a lower-speed parallel type of signal processing. A Rake receiver in an optimal DS-CDMA system uses a fast serial type of signal processing, which results in greater power consumption. In addition, the OFDM technique simplifies the channel estimation problem, thus simplifying the receiver design.

In multicarrier CDMA (MC-CDMA), a spreading sequence is converted from serial to parallel. Each chip in the sequence modulates a different carrier frequency. Thus, the resulting signal has a PN-coded structure in the frequency domain, and the processing gain is equal to the number of carriers. Some implementations of MC-CDMA employ frequency division multiple access. In multi-tone CDMA, the available spectrum is divided into a number of equal-width frequency bands that are used to transmit a narrowband direct-sequence waveform.

U.S. Pat. Nos. 5,519,692 and 5,563,906 describe geometric harmonic modulation (GHM) in which preamble and traffic waveforms are created from multiple carrier frequencies (tones) that are geometric harmonics of a fundamental tone. The waveforms incorporate binary-phase spreading codes, which are applied to the tones.

A preamble carrier waveform is constructed by summing binary-coded tones. Therefore, the preamble signals are similar to MC-CDMA signals. However, unlike MC-CDMA signals, the coded preamble tones do not carry data. Furthermore, due to the binary-phase coding, no tone phase alignment is provided that is capable of conveying data symbols on orthogonal tone superpositions. The inability of binary-phase (e.g., MC-CDMA) coding to produce orthogonal pulse waveforms is described in U.S. Pat. No. 5,955,992. In GHM, each receiver monitors the preamble signals for its assigned phase code and then decodes the appended traffic waveforms.

The traffic waveforms are products, rather than sums, of the binary phase coded tones. Thus, even when the tones are phase aligned, such as illustrated in FIGS. 1a, 1b, and 1c in the '906 patent, the resulting waveforms are not orthogonal pulse waveforms. The receiver generates a reference waveform from a product of tones having phase offsets corresponding to the receiver's phase code. The reference waveform is correlated with the received signals to produce a correlation result that is integrated over the data-bit duration and over all tones.

GHM does not employ polyphase codes. Thus, GHM does not provide carriers with phase relationships that enable precise time-domain control of the carrier superpositions. GHM does not produce pulse waveforms. Accordingly, GHM is not capable of expressing orthogonality in the time domain or reducing peak-to-average-power ratio (PAPR) problems associated with other multi-carrier protocols. Similarly, GHM is not capable of forming waveforms that are backwards compatibility with single-carrier protocols or other multi-carrier protocols.

U.S. Pat. No. 4,628,517 shows a radio system that modulates an information signal onto multiple carrier frequencies. No spreading codes are applied to the information signal or the carriers. Received carriers are each converted to the same intermediate frequency using a bank of conversion oscillators. The received signals are then summed to achieve the benefits of frequency diversity. In this case, frequency diversity is achieved at the expense of reduced bandwidth efficiency.

Each communications protocol presents different benefits and disadvantages. Benefits can be increased by merging different protocols, but only to a limited degree. There is a need for a protocol that solves all or most problems, and is adaptable to all conventional multicarrier and single carrier transmission protocols.

SUMMARY OF THE INVENTION

The principle object of the present invention is to provide a multi-carrier protocol that can be adapted to a wide range of conventional multicarrier and single-carrier protocols. Another object is to present a spread-spectrum protocol that is specifically designed for mobile communications. These objects are accomplished by providing a multicarrier protocol that controls interference relationships between the carriers. This control enables time domain signal shaping, which provides for low PAPR and adaptability to single-carrier waveforms. The protocol enabled by the present invention is Carrier Interferometry (CI).

In CI, carrier frequencies are selected to provide a predetermined spectral response. Polyphase codes are applied to each carrier to control the time-domain characteristics of the superposition signal, as well as provide for orthogonality between data symbols and/or users. In one aspect of the invention, a pulse (i.e., a constructive interference resulting from a zero-phase relationship between the carriers) is generated from a superposition of the coded signals. Time-offset replicas of the pulse are used to construct waveforms having a predetermined frequency-domain profile.

It is an objective of the present invention to provide methods and systems for transmitting and receiving CI signals. To this end, the following objectives are achieved:

An objective of the invention is to reduce the effects of multipath fading and interference. A consequence of this objective is a significant reduction in required transmission power.

Another objective is to provide secure communications by creating transmissions that are difficult to intercept because they are nearly impossible to detect. The low power requirements of the carriers, the spread-spectrum nature of CI, and the noise-like properties of the polyphase codes accomplish this.

Another objective of the invention is to reduce interference to other systems and minimize the susceptibility of the communication system to all types of radio interference.

Another objective of the invention is to minimize and compensate for co-channel interference that occurs when the communication system serves multiple users.

Another objective is to provide a universal communication protocol that provides frequency-diversity benefits of multi-carrier modulation to single-carrier systems and provides the low PAPR benefits of single-carrier modulation to multicarrier communication systems, and the ability to provide the benefits of both systems simultaneously. Further objectives and benefits of the invention are described in the Description of the Preferred Embodiments.

BRIEF DESCRIPTION OF THE DRAWINGS

FIG. 5A illustrates CI signal generation, such as performed by the CI transmitter shown in FIG. 4A.

FIG. 5B illustrates a CI transmitter having signal-processing components that are specific embodiments of some of the transmitter components shown in FIG. 4A.

FIG. 6 illustrates a plurality of equally spaced, contiguous carriers and a non-contiguously spaced subset of the carriers allocated to a particular user or data stream.

DESCRIPTION OF THE PREFERRED EMBODIMENTS

Various terms used in the descriptions of CI methods, systems, and waveforms are generally described throughout the specification. The descriptions in the specification are provided for illustrative purposes only, and are not limiting. The meaning of these terms will be apparent to persons skilled in the relevant art(s) based on the entirety of the teachings provided herein and in the referenced publications.

Figure 1:
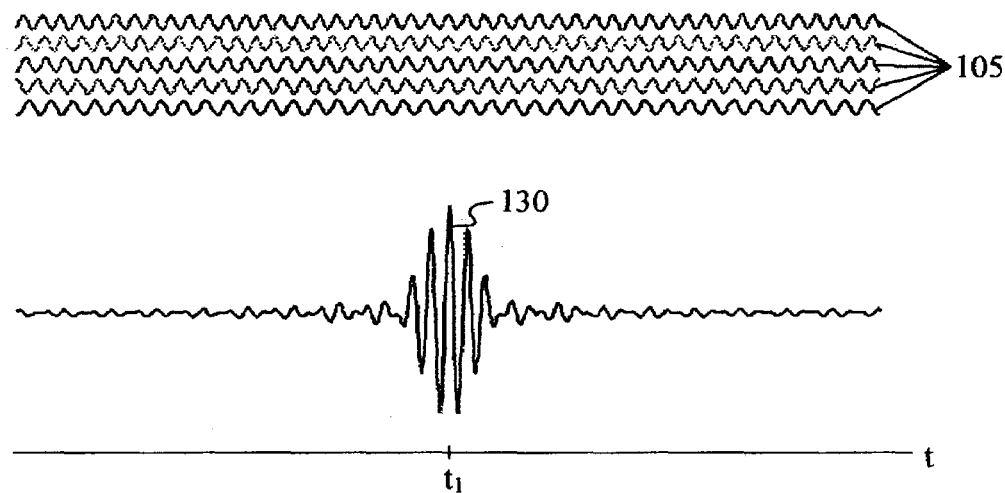
FIG. 1 is a plot of a plurality of CI carriers and a superposition of the carriers.

FIG. 1 illustrates a CI pulse shape characterized by an in-phase alignment (e.g., mode locking) of harmonic sub-carriers 105 at a specific time $t_1$. Methods for generating CI signals may employ continuous-wave systems, such as the pulse generator shown in U.S. Pat. No. 5,955,992. For example, an impulse generator produces sub-carrier harmonics corresponding to the pulse repetition rate. Alternatively, CI pulse shaping may be implemented via sub-carrier generation circuitry, such as Fourier transforms described in WIPO Pub. App. No. WO 99/41871: "Multiple Access Method and System", which is incorporated by reference.

A composite signal 130 results from a superposition (i.e., summation) of the carriers 105. The composite signal 130 shows a pulse envelope centered at a predetermined time instant $t_1$. In the case where there is no amplitude tapering (i.e., a rectangular window) and a plurality N of carriers have a uniform frequency separation $f_s$, a composite CI signal is:

$$e(t) = \sum_{n=1}^{N} e^{i[(\omega_c + n\omega_s)t + n\Delta\phi]}$$

which is characterized by an envelope-magnitude function:

$$|e(t)| = \left|\frac{\sin(N(\omega_s t + \Delta\phi)/2)}{\sin((\omega_s t + \Delta\phi)/2)}\right|$$

where $\omega_c$ is related to a carrier frequency $f_c$ (or equivalently, an offset frequency $f_o = f_c$) by the relationship $\omega_c = 2\pi f_c$. Similarly, $\omega_s$ is related to the separation frequency $f_s$ by the relationship $\omega_s = 2\pi f_s$.

The phase offsets $\Delta\phi$ typically correspond to any of N orthogonal time offsets corresponding to N orthogonal pulse positions. A $k^{th}$ bit or data symbol $a_k$ in a user's transmission s(t) modulated onto a particular CI pulse, or phase space is expressed as:

$$s_k(t) = e(t - kT_b)$$

where $T_b$ is a time offset corresponding to the particular CI pulse. Orthogonal pulses are centered at intervals of $T_b = T_s/N$. A burst of bits or symbols may be transmitted onto a contiguous train of pulses, such as shown in FIG. 2B. In this case, a transmission corresponding to a particular user is characterized by the following relationship:

$$s(t) = \sum_{k=1}^{n} a_k e(t - kT_b).$$

The time-shifted pulses are orthogonal to each other even though the pulses overlap in time:

$$\int_0^{T_s} e(t - kT_b)e(t - nT_b)\delta t \qquad (k \neq n)$$

Figure 2A:
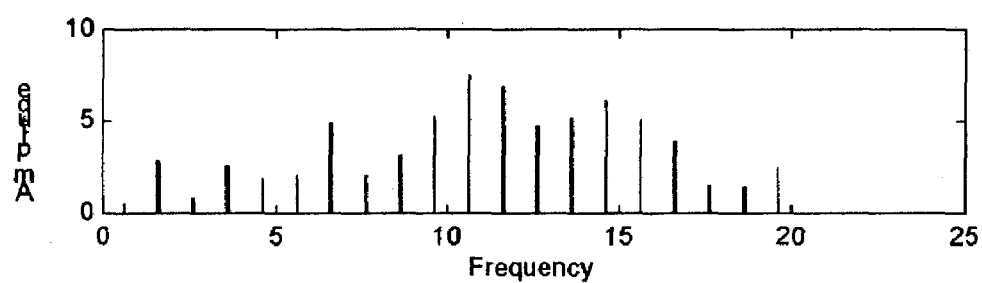
FIG. 2A is a plot of the relative frequency-versus-amplitude profile of a plurality of CI carriers that are combined to produce a time-domain pulse train, such as a DS-CDMA chip sequence.
Figure 2B:
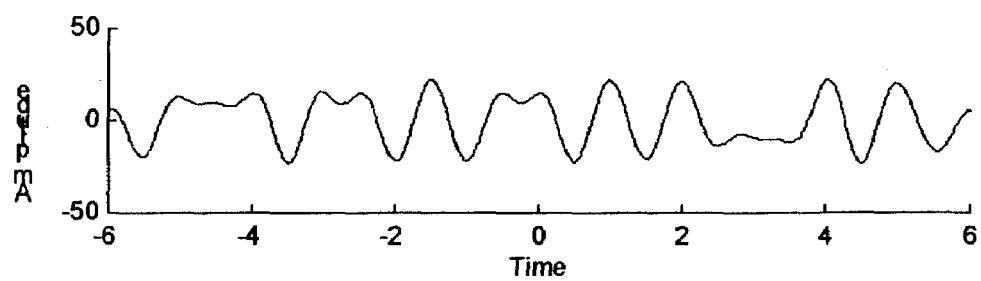
FIG. 2B is a time-domain representation of a modulated pulse train produced by providing time offsets to a plurality of modulated pulses, or equivalently, from a superposition of the CI carriers represented in FIG. 2A.

FIG. 2A illustrates an amplitude distribution of the CI carriers corresponding to the pulse train shown in FIG. 2B. In some applications of the invention, carriers may be provided with complex weights to generate superposition signals corresponding to a predetermined sequence of code chips or data symbols.

Figure 3A:
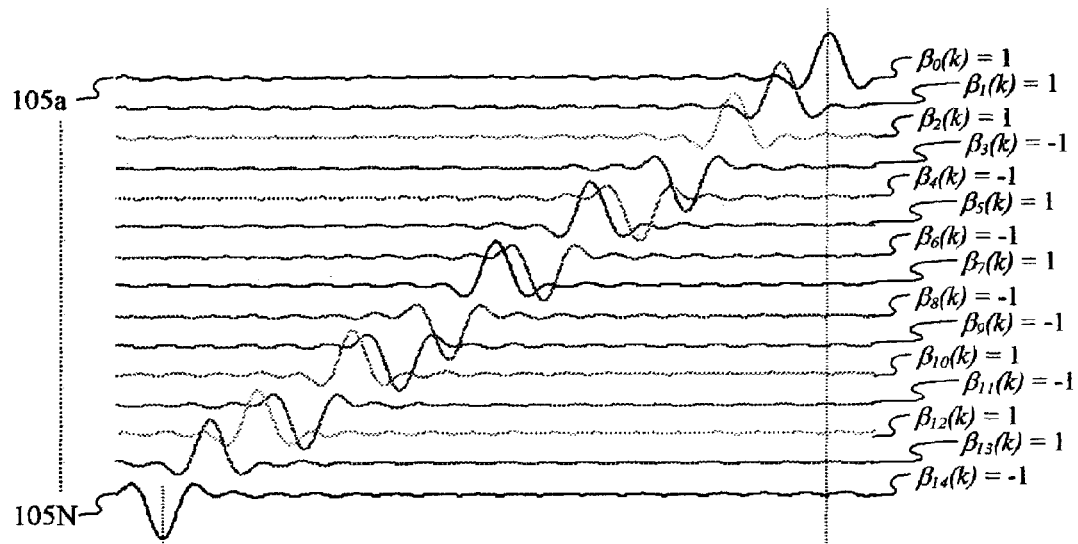
FIG. 3A illustrates a plurality of CI pulse waveforms modulated with code and/or information symbols $\beta_n$ and positioned orthogonally in time.

FIG. 3A illustrates individual CI pulses provided with code chips or data symbols, such as symbols $\beta_0(k)$ to $\beta_{14}(k)$. A pulse train 195 shown in FIG. 3B corresponds to the modulated pulses shown in FIG. 3A.

In time-division multiplexing (e.g., in TDMA), the symbols modulated onto the pulses are typically data symbols corresponding to a particular user. In frequency-division multiplexing (e.g., in OFDM), data symbols corresponding to a particular user are modulated onto a pulse train (such as the pulse train shown in FIG. 2B) constructed from a predetermined set of carrier frequencies allocated to that user. In direct sequence code division multiplexing (e.g., DS-CDMA) or direct sequence spread spectrum, data-bearing code symbols are modulated onto the pulse train. In coded multi-carrier spreading (e.g., MC-CDMA or Spread OFDM), data-bearing code symbols are modulated directly onto the carriers.

The function e(t) is also characterized by an in-phase carrier component $\cos(\omega_c t)$ and a quadrature-phase, component $\sin(\omega_c t)$. The in-phase and quadrature-phase components can correspond to N orthogonal pulse positions (i.e., phase spaces) and N pseudo-orthogonal pulse positions, respectively.

The CI signals are periodic with period $T_s = 1/f_s$ for an odd number of carriers N and with period $2/f_s$ for an even number of carriers N. In either case, data symbols of duration $T_s$ are typically modulated onto the carriers (or pulses). The main lobe has duration $2/Nf_s$ and each of the N-2 side lobes has a duration $1/Nf_s$.

In an exemplary embodiment of the invention, CI is applied to GSM, which is a TDMA system. The number N of carriers may correspond to the number of bits or symbols transmitted per time slot. The duration of a CI-based TDMA signal is N times longer than that of a corresponding TDMA signal that employs Gaussian pulse shaping. Thus, in GSM, CI replaces serial pulses of 3.69 μs duration with 148 parallel, multi-carrier symbols of 576.6 μs duration. This offers several advantageous implementations of GSM, such as steeper spectral roll-off and frequency-domain processing benefits at the receiver. CI provides similar benefits to direct-sequence communications wherein CI's symbol-expansion multiplier (=N) corresponds to the transmission's processing gain.

The amplitude of the $1^{th}$ side lobe with respect to the main-lobe amplitude is:

$$A(l) = \frac{1}{N\sin(\pi(l + 1/2)/N)}$$

Because the period and width of the pulse envelope depends on the amplitude, phase, and frequency separation of the CI carriers, the frequency of each carrier may be changed without affecting the pulse envelope as long as the amplitude, phase, and frequency separation are preserved. Thus, frequency hopping (e.g., FHSS) or frequency shifting (i.e., chirping) of the carriers does not affect the temporal characteristics of the composite signal 130. Providing a tapered amplitude distribution to the CI carriers (in either or both the time domain and the frequency domain) broadens the main-lobe width and reduces the amplitude of the side lobes.

In FIG. 2A, 20 carrier frequencies are allocated to a particular user and provided with complex weights to generate a train of CI pulse waveforms that convey information. FIG. 2B shows 20 pulses orthogonally (and equally) positioned in time corresponding to data transmitted by (or to) that user. Each pulse waveform is a superposition of the 20 carriers provided with phases relative to the orthogonal positions in time. In C. Nassar, B. Natarajan, S. Shattil, "Introduction of Carrier Interference to Spread Spectrum Multiple Access," Proceedings of the *IEEE Emerging Technologies Symposium on Wireless Communications and Systems*, Dallas, Tex., Apr. 12-13, 1999 (Nassar et. al.), which is incorporated by reference, predetermined sets of phase offsets are provided to the carriers to position the pulses orthogonally in time, such as described on page 2, column 1, line 36 to page 2, column 2, line 2.

The cross correlation between the real parts of the pulse waveforms is illustrated by the following equation:

$$R_{k,j}(\tau) = \frac{1}{2f_s} \frac{\sin(2\pi N f_s \tau/2)}{\sin(2\pi f_s \tau/2)} \cos\left(\frac{(N-1)}{2} 2\pi f_s \tau\right)$$

N equally spaced zeros occur over the time interval $T_s=1/f_s$ as a result of the sinc-like term in the cross-correlation equation. This corresponds to each pulse waveform being centered at a particular time instant corresponding to a zero crossing (i.e., zero value) of all of the other orthogonal pulse waveforms.

The cross-correlation equation expresses the Nyquist zero inter-symbol interference criteria. The Nyquist zero inter-symbol interference criteria requires a waveform to have zero crossings corresponding to positions of other waveforms. This orthogonality criteria is also described in Nassar et. al. (page 2, column 1, line 36, to page 2, column 2, line 35) with respect to the cross correlation of CIMA pulses expressed by equations 4 and 5.

The spacing of the pulse positions (i.e., time instants) corresponds to zeroes in the cross-correlation function. The pulses are centered at equally spaced time instants $k/Nf_s$, where $k=0,1,\ldots,N-1$, N is the number of carriers, and $f_s=1/T_s$ is the frequency separation between the carriers. Thus, the time instants are defined by $0, T_s/N, \ldots, T_s(N-1)/N$. Nassar et. al. (page 1, column 2, line 33 to page 2, column 1, line 3) describes CI-based multicarrier systems in which a number of users (i.e., pulse positions) may be greater than the number of carriers. Accordingly, pseudo-orthogonal polyphase codes may be provided, such as for multiple access.

A second set of N zeros corresponds to the cosine term. This second set may correspond to a pseudo-orthogonal set of pulse positions for real data constellations. Alternatively, the second orthogonal set expresses the imaginary component (i.e., quadrature-phase part) of a complex symbol constellation.

The generation of a continuous function via interpolating a series of symbols with a sinc function is a well-known aspect of the Nyquist Sampling Theorem applied to a band-limited signal. For example, this aspect of the Nyquist theorem is described in J. G. Daugman, "Continuous Mathematics, Computer Science Tripos Part IB," University of Cambridge, Term 1999, which is incorporated by reference. Similarly, basic implementations of CI can employ sinc-like functions, such as described and illustrated in U.S. Pat. No. 5,955,992, and Nassar et. al. The present invention advantageously builds CI pulse waveforms from predetermined subcarriers, such as selected relative to spectrum allocation and multiple access.

CI waveforms may be implemented with contiguous or non-contiguous carriers. Contiguous carriers are defined as carriers allocated to one or more users characterized by a frequency separation $f_s$ and symbol duration $T_s=1/f_s$. For example, contiguous carriers having overlapping spectra are illustrated in FIG. 6. However, carriers 601, 602, and 603 allocated to a particular user represent a non-contiguous selection from the set of contiguous carriers.

The carriers 601, 602, and 603 (which represent one set of non-adjacent carrier frequencies allocated to a particular user or data stream) are separated by an integer multiple L of the adjacent carrier frequency separations $f_s$. The frequency spacing of the set of non-adjacent carriers 601, 602, and 603 is $f_s'=Lf_s$. The effective symbol duration $T_s'$ (i.e., effective pulse repetition period) of the non-adjacent carriers is a fraction $1/L$ of the symbol period $T_s=1/f_s$. However, in order to provide orthogonality between adjacent carriers (such as illustrated by the overlapping carrier spectra shown in FIG. 6), which may be allocated to other users or data symbols, the symbol duration is selected to be $T_s=LT_s'$, which is an integer multiple L of the effective pulse repetition period $T_s'$.

Figure 4A:
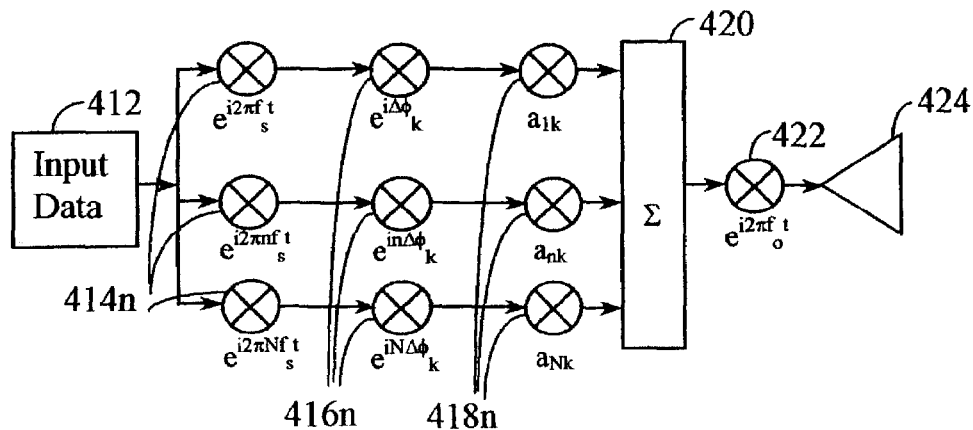
FIG. 4A is a schematic of a transmitter adapted to generate CI-based signals.
Figure 4B:
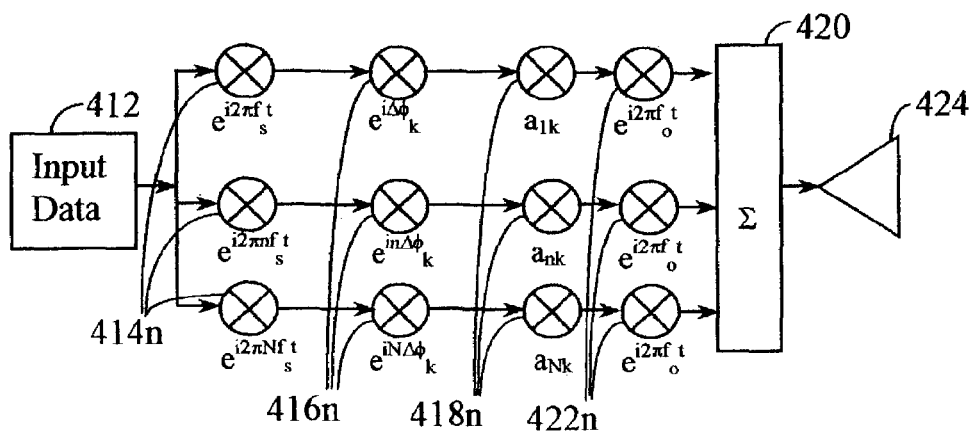
FIG. 4B is a second embodiment of a transmitter adapted to generate CI-based signals.

U.S. Pat. No. 5,955,992 describes a variety of tapered-amplitude windows (including Hanning windows, which is a class of cosine roll-off windows) that may be applied to the carriers in the frequency domain. Polyphase window filters may be employed in the invention. The following publications are incorporated by reference in their entirety. Raised-cosine windows are one type of windowing function that is well known in the art, such as described in U.S. Pat. No. 5,768,308, column 6, lines 50-62. In J. Armstrong, "Analysis of New and Existing Methods of Reducing Intercarrier Interference Due to Carrier Frequency Offset in OFDM," IEEE Trans. Comm., Vol. 47, No. 3, March 1999, windowing systems are shown (FIGS. 4a and 4b) for an OFDM transmitter. Some of the window coefficients may be zero (such as described on page 367, column 2, line 43 to page 368, column 2, line 15) and may include windows adapted to satisfy the Nyquist criteria (page 367, column 2, lines 43-45). H. Bolcskei et. al., "Equivalence of DFT Filter Banks and Gabor Expansions," SPIE Proc. Vol. 2569, "Wavelet Applications In Signal and Image Processing III," San Diego, Calif., July 1995, shows DFT filter banks (page 4, line 9 to page 6, line 10), including an analysis/synthesis filter bank combination, which is a windowing system, such as a zero-insertion circuit. An example of a DFT-based filter adapted to perform zero insertion in an OFDM system is shown in FIG. 4 of J. Armstrong, "PCC-OFDM with Reduced Peak-to-Average Power Ratio."

In a multipath fading channel, each frequency component of the CI signal experiences a different fade. The received signal r(t) can be expressed by:

$$r(t) = \sum_{k=1}^{N} a_k \sum_{i=1}^{N} \alpha_i A \cos(2\pi i \Delta f(t - kT_b) + \phi_i) g(t) + \eta_i(t)$$

where g(t) is the symbol window, $\eta_i$ is the channel noise, $\alpha_i$ is the channel gain, and $\phi_i$ is the phase offset of the $i^{th}$ carrier. The $j^{th}$ data symbol (or bit) $a_j$ can be expressed as N carrier components. Thus, the received signal corresponding to the $j^{th}$ data symbol can also be expressed as carrier components $r_j=(r_{j,1}, r_{j,2}, \ldots, r_{j,N})$. An $i^{th}$ component corresponding to the $j^{th}$ data symbol is expressed as:

$$r_{j,i} = \frac{1}{N} a_j \alpha_i + \sum_{l=1, l \neq j}^{N} \frac{1}{N} a_l \alpha_i \cos(2\pi i \Delta f T_b (j-l)) + \eta_{j,i}$$

The middle term represents inter-symbol interference resulting from fading-induced loss of orthogonality between phase spaces. In cases that employ frequency division between users (i.e., each user is assigned a unique set of carriers), multiple-access interference is avoided.

Various techniques may be employed to combine the carrier components $r_j=(r_{j,1}, r_{j,2}, \ldots, r_{j,N})$. In one aspect of the invention, minimum mean squared error (MMSE) combining results in the following decision variable R:

$$R = \sum_{i=1}^{N} r_{j,i} \left( \frac{\alpha_i}{\alpha_i^2 \sum_{p=1}^{N} \cos(2\pi i \Delta f T_b (p-j))^2 + N_o/2} \right)$$

In some cases, various types and/or combinations of combining may be employed, including equal gain combining, maximum likelihood combining, and orthogonal restoring combining. Other combining techniques may be employed.

Various publications describing CI signal generation and reception include B. Natarajan, C. R. Nassar, and S. Shattil, "Exploiting frequency diversity in TDMA through carrier interferometry," *The 12th Annual International Conference on Wireless Communications WIRELESS*2000, Calgary, Alberta, Canada, Jul. 10-12, 2000, B. Natarajan, C. R. Nassar, and S. Shattil, "Innovative pulse shaping for high-performance wireless TDMA" *IEEE Communications Letters*, Vol. 5, No. 9, September 2001, B. Natarajan, C. R. Nassar, and S. Shattil, "Throughput enhancement in TDMA through carrier interferometry pulse shaping," *IEEE Vehicular Technology Conference VTC*2000, Boston, Mass., Sep. 24-28, 2000, C. R. Nassar, B. Natarajan, and Z. Wu, "Multi-carrier platform for wireless communications. Part 1: High-performance, high-throughput TDMA and DS-CDMA via multi-carrier implementations," *Wireless Communications and Mobile Computing*, Vol. 2, No. 4, June 2002, and C. R. Nassar, B. Natarajan, D. Wiegandt and Z. Wu, "Multi-carrier platform for wireless communications. Part 2: OFDM and MC-CDMA systems with high-performance, high-throughput via innovations in spreading," *Wireless Communications and Mobile Computing*, Vol. 2, No. 4, June 2002, which are all incorporated by reference.

In the DS-CDMA implementation of the invention, such as illustrated in FIGS. 2A and 2B, the real part of each user's transmission is expressed by $$s(t) = \sum_{k=1}^{N} a_k \sum_{m=1}^{N} \beta_m^{(k)} \sum_{i=1}^{N} \cos(2\pi(f_c + if_s)t + mi2\pi/N)g(t)$$

where $\beta_i^{(k)}$ represents the $i^{th}$ direct sequence code chip of a user's $k^{th}$ channel, and the phase term in the cosine corresponding to an $m^{th}$ pulse position is expressed by $mi2\pi/N$. A plurality of users and/or channels (up to N) typically shares the same set of carrier frequencies.

In one aspect of the invention, a receiver processes each received code chip following equalization. An optimized combining scheme, such as MMSEC, may be employed. Alternatively, other receiver processing techniques may be employed. Recovered chips may be decoded using conventional direct-sequence decoding. Optionally, direct-sequence decoding may be implemented in a combining process.

Publications that are particularly applicable to CI/DS-CDMA include C. R. Nassar and Z. Wu, "High performance broadband DS-CDMA via carrier interferometry chip shaping," *International Symposium on Advanced Radio Technologies ISART*2000, Boulder, Colo., Sep. 6-8, 2000, Z. Wu and C. R. Nassar, "MMSE frequency combining for CI/DS-CDMA," *IEEE Radio and Wireless Conference*, Denver, Colo., Sep. 10-13, 2000, Z. Wu, C. R. Nassar, and S. Shattil, "Chip shaping advances for high capacity DS-CDMA," 2001 *International Conference on Third Generation Wireless and Beyond*, San Francisco, Calif., May 30-Jun. 2, 2001, Z. Wu, C. R. Nassar, and S. Shattil, "Next generation high performance DS-CDMA via carrier interferometry," *The 12th Annual International Conference on Wireless Communications WIRELESS*2001, Calgary, Alberta, Jul. 9-11, 2001, C. R. Nassar, "Discovery of a unified multicarrier framework for multiple-access technology?" *SPIE's ITCom* 2001: *Enabling Technologies for 3G and Beyond*, Aug. 20-24, 2001, Denver, Colo., Z. Wu, C. R. Nassar, and S. Shattil, "Ultra-wideband DS-CDMA via innovations in chip shaping," *IEEE Vehicular Technology Conference*, Atlantic City, N.J., Oct. 7-11, 2001, Z. Wu, C. R. Nassar, and S. Lu, "High capacity high performance DS-CDMA via carrier interferometry chip shaping" *IEEE International Conference on Communications (ICC*2002), Apr. 28-May 2, 2002, New York, N.Y., S. A. Zekavat, C. R. Nassar and S. Shattil, "Merging DS-CDMA (with CI chip shapes) and oscillating-beam smart antenna arrays: exploiting transmit diversity, frequency diversity, and directionality," *IEEE International Conference on Communications (ICC*2002), Apr. 28-May 2, 2002, New York, N.Y., and Z. Wu, C. R. Nassar and S. Lu, "Optimum combining for multicarrier DS-CDMA systems," 12th *Virginia Tech Symposium on Wireless Personal Communications*, Blacksburg, Va., Jun. 5-7, 2002, which are incorporated by reference.

In the OFDM implementation of the invention, each user is provided with a unique set of carrier frequencies to eliminate multiple access interference (MAI). Similar frequency-division multiplexing may be provided to other CI-based transmission protocols to reduce or eliminate MAI. The real part of each user's OFDM transmission is expressed by $$s(t) = \sum_{k=1}^{N} \sum_{i=1}^{N} a_k \cos(2\pi(f_c + if_s)t + mi2\pi/N)g(t)$$

where $a_k$ is a $k^{th}$ data symbol (preferably a channel-coded data symbol) that is then spread over the N carriers allocated to the user. Since each data symbol is spread across all of the carriers, the full frequency diversity benefits of the channel can be achieved. Time interleaving may also be provided.

In one aspect of the invention, a received CI-OFDM signal for at least one user is separated into its orthogonal frequency components. Channel compensation (e.g., equalization) and combining are performed to provide estimates of the transmitted symbols. Inter-bit interference may be compensated via any combination of equalization and multi-user detection. While numerous combining techniques may be implemented in the invention, it has been shown in S. Hara and R. Prasad, "Overview of multicarrier CDMA", IEEE Comm. Mag., Vol. 35, no. 12, pp. 126-133, December 1997, which is incorporated by reference, that MMSEC provides the best performance.

Publications that provide a good background for CI-based OFDM include D. A. Wiegandt and C. R. Nassar, "High performance OFDM via carrier interferometry," 2001 *International Conference on Third Generation Wireless and Beyond*, San Francisco, Calif., May 30-Jun. 2, 2001, D. A. Wiegandt, C. R. Nassar, and Z. Wu, "Overcoming PAPR issues in OFDM via carrier interferometry codes," *IEEE Vehicular Technology Conference*, Atlantic City, N.J., Oct. 7-11, 2001, and C. R. Nassar, Z. Wu, and D. A. Wiegandt, "Innovations in OFDM and DSSS for very high performance, very high bit rate WLAN/802.11," *International Symposium* on *Advanced Radio Technology* (ISART2002), Boulder, Colo., Mar. 4-6, 2002, which are all incorporated by reference.

In a CI version of MC-CDMA, each user is provided with at least one orthogonal polyphase multiple-access code. A $k^{th}$ user's spreading code $c_k(t)$ is expressed by:

$$c_k(t) = \{1, e^{i2\pi k/N}, \ldots, e^{i2\pi(N-1)k/N}\}$$

In the case of CI/MC-CDMA, each user's data-bearing code is spread over multiple carriers. In other embodiments of the invention, it has been shown that CI codes may be applied to other signal parameters, such as to provide direct-sequence codes, space-time codes, or space-frequency codes. Receiver processing typically involves some combination of equalization (e.g., time-domain and/or frequency-domain equalization) and decoding (e.g., combining).

Implementations of the invention employing CI codes are described in the following publications, which are incorporated by reference; PCT Appl. No. PCT/US99/02838, titled "Multiple Access Method and System," C. R. Nassar, B. Natarajan, and S. Shattil, "Introduction of carrier interference to spread spectrum multiple access," *IEEE Emerging Technologies Symposium*, Dallas, Tex., Apr. 12-13, 1999, Z. Wu, B. Natarajan, C. R. Nassar, and S. Shattil, "High performance, high-capacity MC-CDMA via carrier interferometry," *IEEE International Symposium on Personal, Indoor, and Radio Communications PIMRC01*, San Diego, Calif., Sep. 30-Oct. 3, 2001, and B. Natarajan and C. R. Nassar, "Crest factor considerations in MC-CDMA with carrier interferometry codes," *IEEE Pacific Rim Conference on Communications, Computers, and Signal Processing*, Victoria, Canada, Aug. 26-28, 2001.

CI may employ pseudo-orthogonal coding on the carriers. Coding may take the form of direct-sequence and/or frequency-domain coding. One objective of pseudo-orthogonal coding is to minimize the magnitude of autocorrelation sidelobes and cross correlations. For example, a family of M normalized complex-valued codes of length N has a lower bound magnitude B(M,N) for the maximum non-peak correlation expressed by:

$$B(M, N) = \left(\frac{M-1}{MN-1}\right)^{1/2}$$

This expression characterizes the peak magnitude of the MN-M autocorrelation sidelobes or $(M^2-M)N$ cross-correlation coefficients. The lower bound for a pair of sequences equals $(2N)^{1/2}$. The lower bound approaches $N^{-1/2}$ as the number of codes M approaches N.

CI may employ various types of complex codes that possess desirable correlation properties. For example, codes may take the form of the following quadric and/or cubic phase codes:

$$c_{quad}(k) = N^{-1/2} e^{i2\pi nk^2/N}$$

$$c_{cubic}(k) = N^{-1/2} e^{i2\pi(k^3+nk)/N}$$

Each of these codes expresses an $n^{th}$ code sequence for $k=1, \ldots N$, where N equals an odd integer greater than two. Autocorrelation sidelobes of quadric polyphase codes are zero. Cubic polyphase codes have non-zero autocorrelation sidelobes and they meet the lower bound of $N^{-1/2}$ when N is prime.

Other polyphase sequences may be employed for spreading data symbols. For example, some families of power residue sequences have desirable correlation properties. Generalizations, combinations, and variations of these techniques will produce additional families of polyphase codes that can be employed in CI signaling.

One aspect of the invention provides for equally spaced, non-contiguous carrier frequencies (PCT/US99/02838). Because fades over non-adjacent frequencies are unlikely to be correlated, more frequency diversity is available when the sub-carrier components for each user are distributed over a wide frequency band.

FIG. 4A shows a flow diagram of a CI transmitter adapted to convert a baseband information signal for at least one user k to a CI-based signal for transmission. Data received from an input data source 412 modulates a number N of carriers with frequencies corresponding to a desired spectral allocation for the at least one user k. This modulation occurs at a plurality of carrier mixers 414*n*. Accordingly, a multi-carrier generator (not shown) may be provided for generating the carriers.

Carrier mixers or a carrier generator, as described herein, includes any type of system, method, or combination thereof adapted to perform at least one of a plurality of functions, including carrier generation, carrier selection, carrier allocation, and modulation. Carrier mixers imply the existence of a carrier generator (e.g., a multi-carrier generator). Thus, carrier mixers and carrier generator can be equivalent terms as used herein. A carrier generator may include a carrier-mixer circuit. A carrier mixer may include any type of mixer, modulator, or equivalent device adapted to provide carrier selection and/or modulation. Carrier mixers/carrier generators may include local oscillators, harmonic signal generators, digital filters, invertible transform algorithms, quadratic mirror filters, sine wave look-up tables, etc. Carrier mixers may be interpreted as performing frequency-domain processes.

Carrier mixers or carrier generators may employ digital signal processing systems, such as microprocessors, may be employed. Consequently, Fourier transforms, such as DFT-based systems may be employed. For example, an IFFT or IDFT may be employed with one or more weight vectors applied to the frequency bins of the transform. A carrier mixer (or carrier generator) may include a weight-vector selector adapted to select predetermined frequency bins. A weight vector may include zero and non-zero values, such as to provide for carrier selection/allocation. Carrier mixers may include one or more carrier-allocation circuits. A carrier mixer allocates one or more carriers to one or more users. A carrier mixer may provide for modulation of data symbols onto the carriers. A carrier mixer may include a plurality of modulators or a modulator adapted to modulate at least one data symbol onto a plurality of carriers.

In this case, the frequencies of the CI carriers are incrementally spaced by a shift frequency $f_s$. However, non-uniform spacing of the frequencies may also be used to achieve certain benefits, such as described in U.S. Pat. No. 5,955,992. The carrier frequencies are typically chosen to be orthogonal to each other:

$$\int_0^{T_c} \cos(\omega_i t + \phi_i)\cos(\omega_j t + \phi_j)dt = 0$$

where $T_c$ is the chip duration, $\omega_i$ and $\omega_j$ are the $i^{th}$ and $j^{th}$ carrier frequencies, and $\phi_i$ and $\phi_j$ are arbitrary phases. A signal in the $j^{th}$ frequency band does not cause interference in the $i^{th}$ frequency band.

The term carrier, as used herein with respect to a multi-carrier signal or system, is equivalent to the terms subcarrier and tone. Orthogonal carriers may be characterized by constant-frequency carriers with orthogonal frequencies. Alternatively, orthogonal carriers may employ dynamically varying carrier frequencies, such as chirped or hopped carriers. For example, the frequency separation between a set of orthogonal carriers with dynamic frequencies may be constant or limited to integer multiples of an orthogonal frequency spacing $f_s$.

An input data source includes any input port adapted to receive data bits and/or data symbols, such as coded data bits and/or symbols. An input data source may include any apparatus and/or algorithm adapted to generate data, such as coded or uncoded data bits and/or symbols. An input data source may include at least one coder and/or coding algorithm. Channel coding may include any combination of well known channel coding techniques, such as trellis, block, convolutional, parity check (e.g., Gallagher coding or any other type of low-density parity check coding), and iterative soft-decision feedback (e.g., turbo) coding.

The phase of each CI signal is set with respect to at least one predetermined receiver time interval (i.e., phase space) in which the carriers constructively combine when received by a CI receiver. A set of incremental phase offsets $e^{in\Delta\phi}{}_k$ corresponding to at least one pulse position is applied to the CI carriers by one of a plurality N of interval delay (i.e., phase) systems $416n$. Each pulse's phase space is a set of carrier phases corresponding to the time instant at which the pulse is centered. Thus, each set of phase offsets maps a data symbol to a pulse centered at a particular instant in time.

Interval delay systems, or equivalently, phase-shift systems, include any type of phase shift module, delay module, temporal mapping module, polyphase code module, polyphase filter, etc., adapted to map data symbols to pulse positions. A pulse position is an instant in time at which a CI pulse is centered. A pulse, as used herein, typically refers to a single-pulse waveform generated from a superposition of selected carriers. Pulse waveforms may include a plurality of pulses, such as a pulse train. Delay systems are systems, algorithms, and/or devices adapted to provide time offsets (i.e., phase shifts) to individual carriers to generate carrier superpositions (pulse waveforms). Delay systems may provide phase offsets and/or time offsets to carriers and/or data symbols.

A delay system is typically configured to receive as input at least one of a data sequence and a set of carriers. The delay system directly maps data on modulated carriers to particular instants in time. The delay system may align carriers to produce pulse waveforms centered at one or more time instants and then modulation may be provided to the pulse waveforms. An interval delay system may include a polyphase coder adapted to provide polyphase codes to data symbols and/or carriers. A delay system may provide polyphase codes to frequency bins of an invertible transform, such as an IDFT or IFFT.

Each CI carrier may have its gain adjusted by an optional amplitude-control system $418n$. The amplitude-control system $418n$ is adapted to provide a gain profile to the CI signals. This profile may include a tapered-amplitude window with respect to the frequency domain, compensation for flat fading of the carriers in the communications channel, and/or pulse-amplitude modulation of the CI carriers. The signals may be predistorted in the transmitter in such a manner that compensates for fading and/or inter-symbol interference of the channel upon transmission. Pulse shaping (e.g., windowing) may be provided, such as described in U.S. Pat. No. 5,955,992.

An amplitude-control system includes any apparatus, method, and/or algorithm adapted to provide a predetermined frequency-domain gain profile to a set of multi-carrier signals. An amplitude-control system may provide carrier selection (or equivalently, carrier deletion). Amplitude-control systems may include windowing systems, filters, spectrum allocation systems, and/or any other type of spectrum shaping systems.

The gain-adjusted CI carriers are summed by a combining system 420. A frequency converter 422 may be used to convert the CI signals to the appropriate transmit frequencies, which are conveyed to an output coupler 424.

The output coupler 424 is any device adapted to couple CI transmit signals into a communications channel. For radio communications, the output coupler 424 may include one or more antenna elements (not shown). The output coupler 424 typically includes one or more filters, amplifiers, frequency converters, D/A converters, and/or any other signal-processing modules adapted to process the transmit signals into a form that is appropriate for coupling into a given channel. For optical communications, the output coupler 424 may include a lens or simple coupling element that couples light into an optical fiber.

Although the apparatus diagrams illustrated herein illustrate the generation of CI transmission signals as step-by-step procedures, a preferred embodiment for accomplishing these processes may use digital signal-processing techniques, such as Discreet Fourier Transforms.

The order of some of these processes may be switched. For example, modulation of each carrier by the input data may be the final step before combining. Alternatively, the data symbols may modulate the combined carriers. The implementation of complex data modulation schemes in multicarrier systems, such as OFDM systems, is well known. For example, in U.S. Pat. No. 5,406,551, column 1, lines 27-44; Quadrature Phase Shift Key (QPSK) modulation and Quadrature Amplitude Modulation (QAM) are described with respect to modulation techniques used in OFDM systems. Other variations of these modulation schemes may be employed by the present invention, including Differentially Encoded Phase Shift Key modulation, Cross Correlated Phase Shift Key modulation, Tamed Frequency Modulation, Gaussian FSK, Gaussian Minimum Shift Keying, as well as others described in Feher, "Wireless Digital Communications: Modulation and Spread Spectrum Techniques," Prentice Hall, 1995, and in U.S. Pat. Nos. 4,567,602, 5,491,457, 5,784,402, and 6,470,055, which are all incorporated by reference.

It is well known to provide relative phase offsets, such as phase offsets equal to $\pi/4$, to adjacent time-domain symbols for the purpose of reducing peak-to-average power of the transmitted signal. This is known in the art as Offset Quadrature Phase Shift Keying (OQPSK). For example, H. Abut, "Digital Communications for Emerging Systems" course notes, Aug. 6-8, 1997, describes OQPSK systems in Chapter 4, Section 3. Pages 4-7 of Chapter 4, Section 3 show $\pi/4$-QPSK. Quadra "Electromagnetic Compatibility Aspects of Radio-based Mobile Telecommunications Systems—Final Report," Produced in 1999 for the LINK Personal Communications Programme by ERA Technology Ltd, (page D3, line 8 to page D4, line 9) describes delaying an odd bit stream with respect to an even bit stream in an OQPSK system.

FIG. 4B shows a flow diagram for generating CI signals. Each of these processes is similar to the processes shown in FIG. 4A. The difference between the diagrams is that in FIG.

4B, the carriers are not combined until they are transmitted into the communication channel. An illustration of this is shown in FIG. 4C.

Figure 4C:
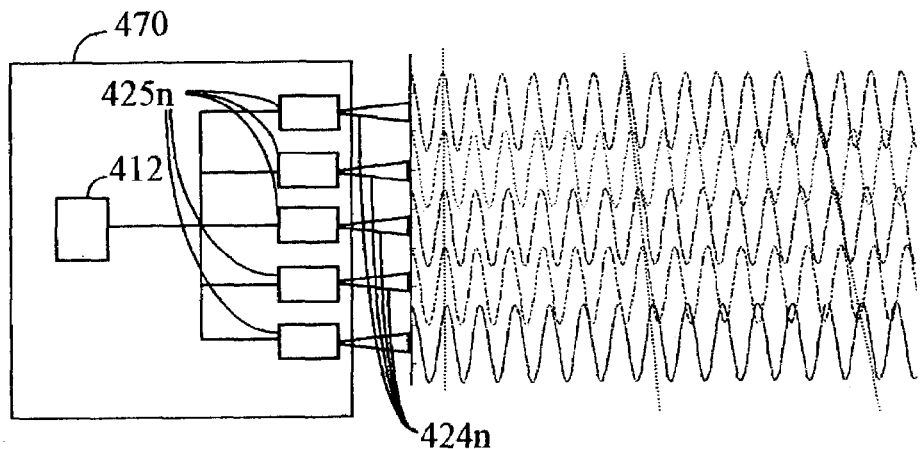
FIG. 4C is a schematic of a transmitter adapted to separately process and transmit each of a plurality of orthogonal subcarriers used in a CI-based transmission. The subcarriers are emitted by an antenna array and combined in a communications channel to produce a carrier-superposition signal. Since each antenna element transmits a different carrier frequency of the multicarrier signal, the resulting spatial beam sweeping provides simultaneous diversity and directionality benefits.

FIG. 4C shows a data stream from the data source 412 being used to modulate a plurality of carriers at a plurality of mixers 425n. A CI carrier with a specific frequency, phase relationship, and gain profile is input to each mixer 425n, typically from a multi-carrier generator (not shown). Each bit from the data source 412 modulates all of the CI carriers. Each mixer 425n is connected to one of a plurality of antenna-array elements 424n; thus, each antenna element 424n transmits only one carrier. The array elements 424n typically include filters, amplifiers, and/or any other signal-processing modules adapted to process the transmit signals into a form that is appropriate for coupling into a given channel. Since each antenna element transmits a single carrier, low PAPR at the corresponding amplifiers is maintained.

The approach of over-the-air combining of multi-carrier signals is described in U.S. Pat. No. 5,955,992. Furthermore, the implementation of CI with array-processing techniques, such as MIMO (e.g., Applicant's U.S. Pat. Nos. 6,008,760, 6,331,837, and 6,211,671, which are incorporated by reference) is anticipated by this invention.

Spatial beam sweeping resulting from the in-channel combining of the carriers provides certain diversity benefits, such as described in PCT/US99/02838. Similar diversity benefits can be provided to other communication systems, such as described in S. A. Zekavat, C. R. Nassar, and S. Shattil, "Smart antenna spatial sweeping for combined directionality and transmit diversity," *Journal of Communications and Networks: Special Issue on Adaptive Antennas for Wireless Communications*, Vol. 2, No. 4, December 2000, pp.325-330, which is incorporated by reference.

The invention provides for any of various forms of duplexing, such as frequency division duplexing, code division duplexing, and time division duplexing (TDD). TDD allows for a highly efficient and cost-effective architecture, since the same frequency is used for both transmission and reception and the channel characteristics in both directions are virtually identical. In array-processing applications, the beam-forming weights can be determined from a base station antenna array for the reverse link and the same weights can be used on the forward link without requiring multiple antennas at the remote unit. This allows the system to deliver the capacity and interference mitigation benefits of adaptive beam forming for both the uplink and the downlink while keeping the complexity and cost of the remote unit very low. Furthermore, the TDD approach eliminates expensive diplexing filters and permits the use of a single RF chain, further reducing subscriber-unit costs.

Although the collection of carriers has data redundancy due to the same bit being modulated onto multiple carriers, the frequency and phase relationships between the carriers cause orthogonality in time (illustrated by the Inverse Fourier Transform of the CI carriers in the frequency domain). This orthogonality negates the typical decrease in bandwidth efficiency caused by data redundancy and retains the benefits of frequency diversity. The orthogonality results from constructive and destructive interference between the CI carriers. Constructive interference causes narrow time-domain pulses with a repetition rate proportional to the inverse of the carrier-frequency spacing $f_s$.

The preferred embodiments demonstrate a few of the many methods for generating and receiving CI signals. This was done to provide a basic understanding of the characteristics of CI. With respect to this understanding, many aspects of this invention may vary; for example, the methods used to create and process CI signals. It should be understood that such variations fall within the scope of the present invention, its essence lying more fundamentally with the design realizations and discoveries achieved than the particular designs developed.

In some cases, CI carriers may be generated. In other cases, predetermined carriers or pulse waveforms may be selected from a memory device (not shown). For example, U.S. Pat. No. 5,491,727 describes a look-up table of sine values and a table of envelope (i.e., pulse) functions stored in memory and used to generate signals for transmission in a multi-tone communication system.

FIG. 5A is a functional diagram of the processing performed by the CI transmitter shown in FIG. 4A. An allocation step 414 is performed by the carrier mixers 414n, which allocate a plurality of carrier frequencies (i.e., tones) to a particular user. A mapping step 416 is performed by the phase-shift/delay systems 416n, which map each data symbol from data source 412 to a particular pulse position. A pulse-generation step 420' is performed by the combiner 420, which receives the allocated carriers as inputs and generates CI pulses at predetermined pulse positions. The resulting data-bearing CI waveform may be an analog or digital signal. If it is an analog signal, the waveform may optionally be sampled 421.

The plurality of carrier mixers 414n performs the allocation step 414 that provides carrier frequencies used to generate at least one superposition signal for a particular user. The plurality of phase-shift/delay systems 416n provides the mapping 416 of each data symbol from the data source 412 to a predetermined instant in time (i.e., pulse position). Each set of phase shifts applied to the information-modulated carriers by the phase-shift/delay system 416n produces a phase alignment of the carriers (i.e., an interference pulse) at the predetermined instant in time. Thus, the combination of the phase-shift/delay systems 416n and the data source 412 produces a discrete signal of the mapped data symbols. The data symbols are typically provided with polyphase codes and modulated onto the individual CI carriers. Each polyphase code maps its associated data symbol to a particular instant in time. Alternatively, the data symbols may be modulated directly onto the pulse waveforms.

A combining system, or combiner, as described herein, is any system, device or algorithm adapted to combine a plurality of allocated carriers (for transmission or reception) to produce a time-domain waveform. A combiner may be interpreted as a frequency-domain to time-domain converter. A combiner may be referred to as an interpolation circuit because it generates a time-domain waveform from a plurality of frequency-domain components. A combiner may include an inverse-Fourier transform, such as an IDFT or IFFT circuit or algorithm. Thus, one way to implement carrier generation and combining is to provide an IDFT. Consequently, carrier selection and data-symbol mapping may be performed by a polyphase coder adapted to generate a vector of frequency-bin weights.

Figure 3B:
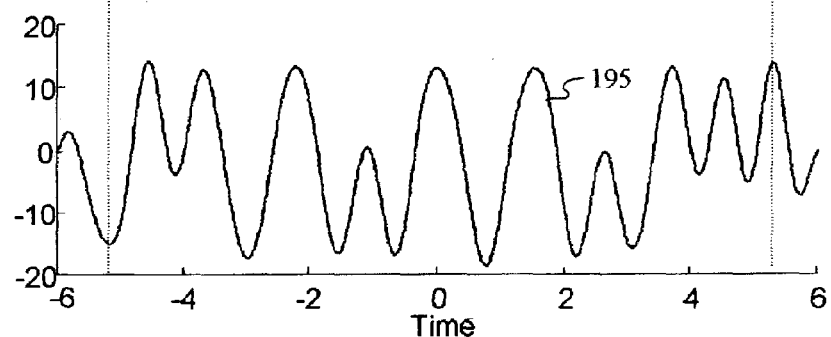
FIG. 3B illustrates a CI pulse train of orthogonally time-offset pulses.

The combining system 420 (which may equivalently be an interpolation circuit) is adapted to perform pulse generation 420 as it combines the phase shifted carriers to produce one or more information-modulated pulses centered at the predetermined instants in time. A plurality of information-modulated pulses may be positioned contiguously in time (such as shown in FIGS. 2B and 3B) to provide a substantially uniform (low PAPR) signal over a predetermined interval (e.g., symbol period $T_s$ or some multiple thereof). The pulse waveforms are functions that span the symbol duration $T_s$. In this case, a pulse waveform may be a digital or analog signal. The frequency response of the pulses includes sinusoids provided by the carrier mixers 414n (i.e., allocation circuit).

The sampling step 421 is commonly used in prior-art digital communication transmitters. For example, B. Sklar, *Digital Communications*, P T R Prentice Hall, Upper Saddle River, New Jersey, 1988, which is incorporated by reference, shows a formatting system (FIG. 2.2) in a digital communication transmitter that includes a sampling circuit. Various types of information signals, including analog (i.e., continuous) signals, are formatted prior to being coupled to a waveform encoder (i.e., a modulator). Formatting analog signals includes sampling the signals in order to generate a sequence of binary bits. Then the bits are mapped to a constellation of modulation symbols (e.g., phase shift key, amplitude shift key, or quadrature amplitude shift key symbols) in a modulator. Further descriptions of formatting analog signals are disclosed in B. Sklar on page 59, line 6 to page 70, line 19.

FIG. 5B illustrates a CI transmitter having signal-processing components that are specific embodiments of transmitter components shown in FIG. 4A. The CI transmitter includes a subcarrier allocation module 514, a mapping module 516, and an interpolation module 520. The modules 514, 516, and 520 are adapted to perform the method illustrated in FIG. 5A.

The subcarrier allocation module 516 performs the function of the carrier mixers 414n. Sub-carrier allocation assigns a predetermined number N of carriers to one or more users wherein the carrier frequency spacing $f_s$ and data symbol period $T_s$ are selected to ensure orthogonality between the carriers. Orthogonality may be provided between the allocated carriers and unallocated carriers (e.g., carriers assigned to other users). For a number N of carriers, there are N orthogonal phase spaces (i.e., pulse positions). Thus, the number of users in an orthogonal CI system is less than or equal to the number N of carriers.

The carriers corresponding to each user may include contiguous carrier frequencies or uniformly spaced frequencies distributed over a broad frequency band, such as shown in FIG. 6. Each user may be allocated a unique set of carriers, thus providing for orthogonal frequency division multiple access. For example, equally spaced subcarriers (such as subcarriers 601, 602, and 603) allocated to a particular user are interleaved with respect to subcarriers allocated to other users. Thus, a combination of frequency diversity and frequency division multiple access is provided. Alternatively, two or more users may share at least one set of carrier frequencies. Thus, CI may employ other multiple-access schemes, including time division and code division.

The mapping module 516 is equivalently a multicarrier phase-shift module, such as the plurality of phase-shift/delay systems 416n shown in FIG. 4A. Like the phase-shift/delay systems 416n, the mapping module 516 maps each data symbol from a data source (such as data source 412) to a predetermined instant in time. Incremental phase offsets applied to a plurality of carriers are equivalent to a time offset (e.g., delay) applied to a superposition of the carriers. Each set of phase offsets produces a phase alignment of the carriers (i.e., an interference pulse) at a predetermined instant in time, thus, mapping each data symbol to an instant in time.

The carriers are provided by the subcarrier allocation module 514 (e.g., a plurality of carrier mixers 414n) and modulated with one or more data symbols. Modulation may be performed at the carrier mixers 414n. Alternatively, each CI pulse may be modulated after the carriers are combined. In either case, the combination of the phase-shift/delay systems 416n and the data source 412 produces a discrete signal consisting of the mapped data symbols.

The interpolation module 520 can be expressed by the combining system 420. The interpolation module 520 combines the phase-shifted carriers to produce one or more information-modulated pulses centered at the predetermined instants in time. The subcarrier allocation module 514 provides the carriers from which the pulses are produced. Thus, the frequency response of the pulses may include only the sinusoids allocated by the subcarrier allocation module 514 to a particular user. Since each user may be assigned a unique set of carriers, the pulse waveforms produced by the communication system can include non-zero sinusoids allocated to a particular user and zero-valued (i.e., an absence of) sinusoids allocated to other users.

The CI transmitter components illustrated in FIGS. 4A and 5B, as well as other components in the transmitter, may be implemented as digital signal processing components. Consequently, the information-modulated pulses generated by a CI transmitter may be a digital signal sample vector.

Since the CI pulses are positioned orthogonally in time if the phase offsets are appropriately selected, signal characteristics (e.g., phase, amplitude, frequency, etc.) of each pulse at the pulse maxima conveys the data symbol value assigned to the corresponding phase space (i.e., instant in time at which the pulse is centered).

Figure 7:
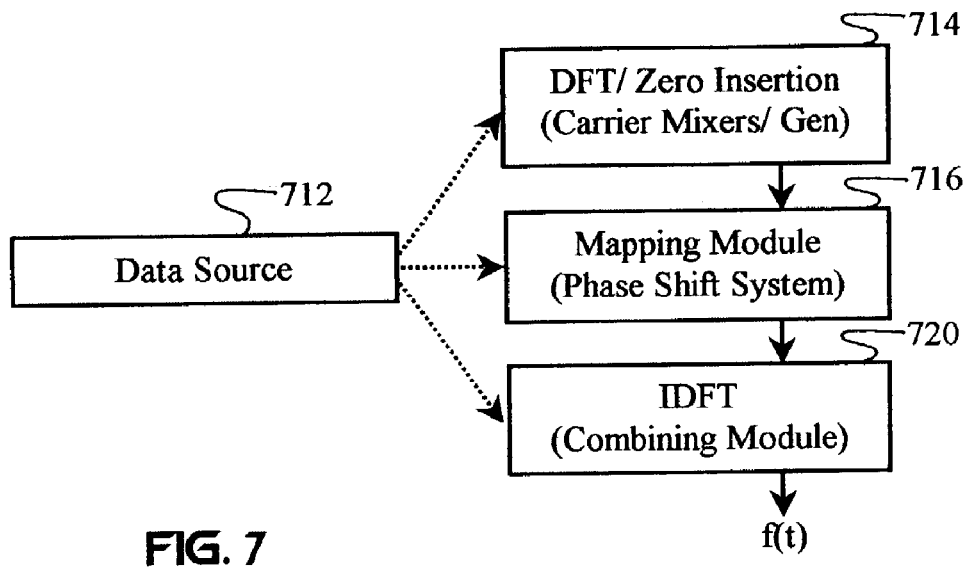
FIG. 7 illustrates a system and method of generating CI signals corresponding to the transmitter components shown in FIG. 4A.

FIG. 7 illustrates equivalence between two aspects of a CI transmitter of the invention. A set of carrier mixers 714 (which typically includes a multicarrier signal generator) is adapted to allocate a set of carriers to a particular user. Thus, the carrier mixers 714 perform the same function as a Discreet Fourier Transform (DFT) circuit combined with a zero-insertion circuit. For example, the spectrum allocation illustrated in FIG. 6 implies that carriers corresponding to other users are removed, avoided, or otherwise set to zero.

A phase-shift/delay system 716 is adapted to map each of a plurality of data symbols from a data source 712 to a predetermined instant in time. The data source 712 provides data symbols to any of the transmitter modules 714, 716, and/or 720. Data symbols may be modulated directly onto individual carriers, data-bearing polyphase codes may be generated, or CI pulse waveforms may be modulated with data. The phase-shift/delay system 716 applies sets of phase offsets to a plurality of carriers, which are provided by the carrier mixers 714 and optionally modulated with one or more data symbols. Each set of phase offsets produces a phase alignment of the carriers (i.e., an interference pulse) at a predetermined instant in time, and thus, maps each data symbol to an instant in time. The combination of the phase-shift/delay systems 716 and the data source 712 produces a discrete signal of the mapped data symbols.

A combining system 720 combines the modulated, phase-shifted carriers to produce information-modulated pulse waveforms. These pulse waveforms are inverse Fourier transforms of the carriers represented in the frequency domain, such as described on page 5, lines 28-31 of PCT/US99/02838. Thus, the combining system 720 performs the same function as an Inverse-DFT circuit. Although not shown, a gain adjustment module or system (e.g., a pulse-shaping filter 418n) may optionally be included in the transmitter.

CI signal generator systems of the present invention may include a transmission system, such as is known in the art with respect to single carrier and multicarrier communications. For example, a transmitter may include analog and/or digital components typically used to process a baseband signal for transmission into a communication channel.

Figure 8:
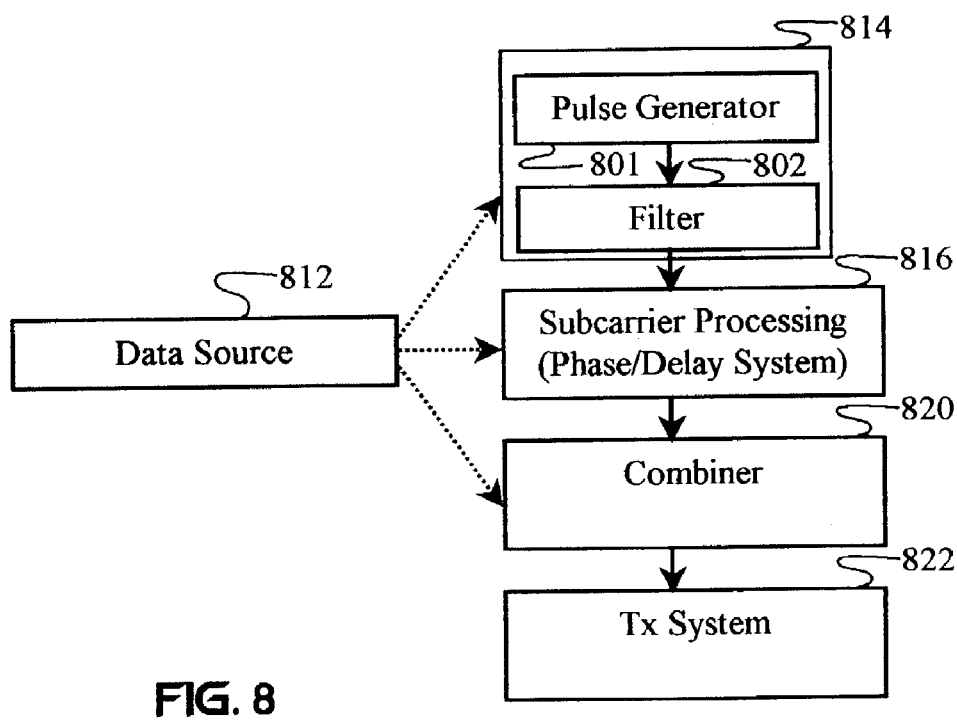
FIG. 8 illustrates an alternative embodiment of a system and method for generating CI signals.

FIG. 8 illustrates a specific embodiment of a CI transmitter, such as the CI transmitter shown in FIG. 4A. A carrier generator/mixer circuit 814 includes a pulse generator 801 and a carrier-selection filter 802, such as shown in U.S. Pat. No. 5,955,992. The pulse generator 801 is adapted to generate pulse having a predetermined pulse-repetition frequency to provide a predetermined multicarrier output. Other pulse-generation parameters, such as pulse shape, may be selected and/or adapted to provide for desirable spectral characteristics.

A subcarrier processing module 816 may be adapted to provide phase offsets to the selected carriers, provide polyphase coding to the carriers, modulate data (or coded data) symbols onto the carriers, and/or provide for carrier gain adjustments (e.g., pulse shaping, channel compensation, carrier selection, etc.). Accordingly, the sub-carrier processing module 816 may include any combination of digital filters, modulators, coders, phase shifters, and channel-compensation circuits.

A combiner 820 is optionally provided to generate a superposition of the carriers. A transmission module 822 processes the baseband multicarrier signal and couples the processed signal into a communication channel. Although the combiner 820 is shown coupled between the subcarrier processing module 816 and the transmission module 822, in-channel combining may be provided. Accordingly, transmitter components (not shown), such as amplifiers, frequency converters, and guard-interval modules may be provided separately to each subcarrier.

A data source 812 is coupled to at least one of the modules 814, 816, and 820. The pulse generator 814 may be modulated with-data or otherwise adapted to generate information-modulated pulses. Alternatively, the subcarrier processing module 816 may be adapted to modulate data onto the pulses or the selected individual carriers. In another embodiment of the invention, the combiner 820 includes a modulator (not shown) adapted to modulate data symbols from data source 812 onto the superposition signal.

U.S. Pat. No. 6,331,837 (which is assigned to the Applicant and incorporated by reference herein and reference in U.S. patent application Ser. No. 09/703,202, which claims priority to Provisional Appl. No. 60/163,141 filed on Nov. 2, 1999) describes guard intervals selected to compensate for multi-path delay spreads. Cyclic prefixes are one type of guard interval that may be employed.

The use of a cyclic prefix in multi-carrier communications is well known. For example, in J. van de Beek, "On Synchronization in OFDM Systems Using the Cyclic Prefix," Proc. Radio Vetenskaplig Koferens, pp. 663-667, June 1996, which is incorporated by reference, cyclic prefixes in common Discreet Multitone Systems consist of a copy of a number of samples at the end of a symbol being prepended to the beginning of the symbol. Similarly, the use of a cyclic prefix in single-carrier modulation is well known, such as described in A. Czylwik, "Comparison between adaptive OFDM and single carrier modulation with frequency domain equalization," VTC, pp. 865-869, Phoenix, 1997, which is incorporated by reference. Various types of guard intervals are well known in the art and may be employed by the invention. The symbol duration $T_s$ may be provided with extra length to compensate for delay spread. A cyclic redundancy may be added to the end of a symbol block. A cyclic redundancy may be split between a cyclic prefix and a cyclic postfix. Zero values may be provided to the guard intervals.

Embodiments of the invention may employ any of a number of techniques for providing channel estimating. For many of these methods, a block of pilot chips, tones, or other known signals may be inserted into the transmitted waveform. Known symbols may be mapped to CI phase spaces. Training symbols may be provided to individual subcarriers. In other embodiments, various types of coded training symbols may be transmitted. Blind adaptive estimation and equalization may be employed.

Figure 9A:
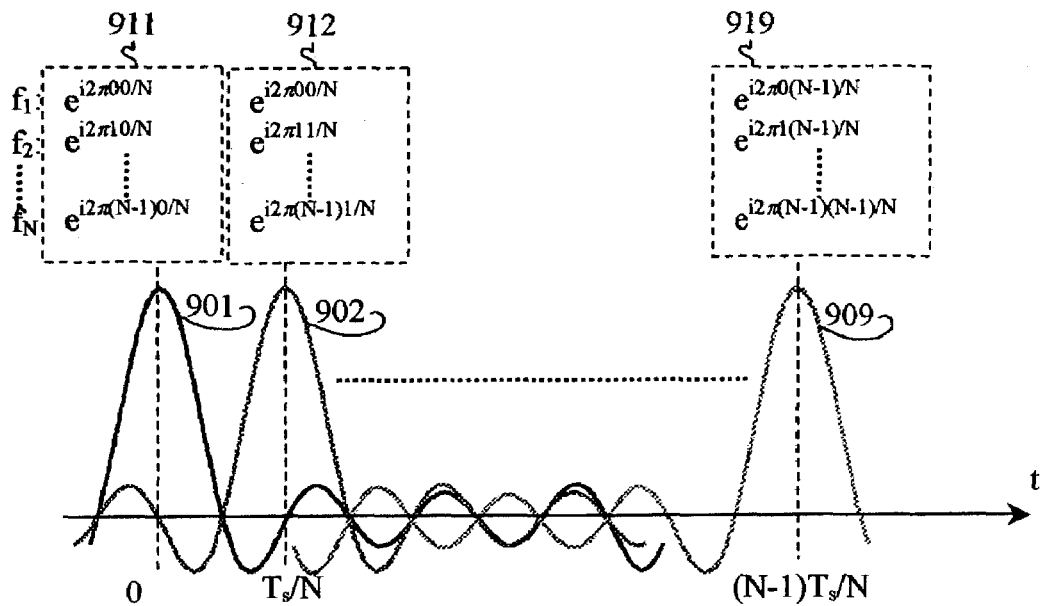
FIG. 9A is a time-domain plot of a plurality of pulses 901 to 909 generated from a superposition of equally spaced carriers. This plot also shows a set of carrier phases corresponding to each of the pulses.

FIG. 9A illustrates a plurality of CI pulse waveforms 901 to 909 orthogonally positioned in time. A plurality N of equally spaced carriers $f_1, f_2, \ldots, f_N$ are combined to generate the pulses 901 to 909. A set of carrier phases 911, 912, ..., 919 corresponds to each of the pulses 901, 902, ..., 909, respectively. Each set of carrier phases 911, 912, ..., 919 is an orthogonal polyphase CI code (or phase space) applied to the carriers to center a given pulse waveform at a corresponding instant in time.

A complex-valued data symbol (not shown) impressed onto a pulse (such as pulse 901) may be characterized by an in-phase (e.g., real) part modulated onto pulse 901 and a quadrature-phase (e.g., imaginary) part modulated onto a pulse waveform (not shown) centered equidistantly between pulses 901 and 902. Similarly, a first set of N real data symbols may be impressed onto a first set of N orthogonal pulses (such as the pulses 901 to 909). A second set of real data symbols may be impressed onto a quadrature-phase set of orthogonal pulses (not shown) centered equidistantly between adjacent pairs of the pulses 901 to 909.

Complex carrier weights corresponding to each of the carriers $f_1, f_2, \ldots, f_N$, represent a sum of the phase spaces 911, 912, ..., 919 multiplied by their corresponding data symbols. In particular, an $n^{th}$ (n=1,2, ...,N) carrier's complex weight equals the sum of each complex data symbol in the $n^{th}$ row of each phase space 911, 912, ..., 919 multiplied by the data symbol value (not shown) associated with that phase space 911, 912, ..., 919 (i.e., pulse position 901, 902, ..., 909).

Figure 9B:
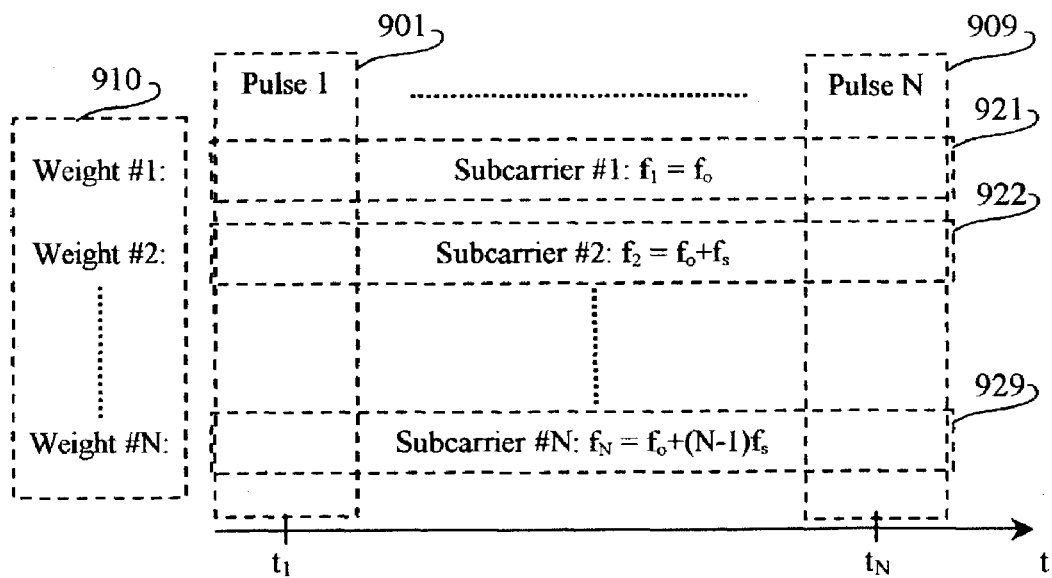
FIG. 9B represents basic components and characteristics of a CI waveform of the present invention. CI waveforms may be considered to be articles of manufacture.

FIG. 9B represents a CI waveform of the present invention. A plurality N of subcarriers 921 to 929 (e.g., sinusoids, or tones) are characterized by at least one predetermined set of complex sub-carrier weights 910. These weights 910 align the sinusoids 921 to 929 to produce a train or sequence of information-modulated pulses 901 to 909 in the time domain. These pulses 901 to 909 may be generated by applying the sub-carrier weights 910 to subcarriers (such as subcarriers 921 to 929) allocated to at least one user in a network.

A network may be characterized by various types of communication architectures having two or more users, or nodes, including point-to-point, point-to-multipoint, broadcast, multipoint-to-multipoint, multipoint-to-point, hierarchical, ad-hoc, peer-to-peer, multi-hop, and cellular. The invention is independent of the type of network. Accordingly, other network configurations may be employed. Similarly, the invention is independent of the propagation medium (i.e., communication channel) connecting the nodes.

Alternatively, multiple time-offset pulses are combined wherein each pulse 901 to 909 is generated from a superposition of predetermined subcarriers 921 to 929 and modulated with a corresponding data symbol. In some cases, time-domain waveforms are provided with frequency-domain processing (e.g., pulse-rate control, rise-time and roll-off control, pulse shaping, pulse-width control, frequency-selective filtering, windowing, and/or frequency masking) to generate pulse waveforms having predetermined spectral characteristics.

Variations of the disclosed pulse-generation techniques and/or multicarrier-generation techniques, as well as other techniques, may be employed in generating CI pulse waveforms. Pulse generators include circuits, systems, software, etc., adapted to generate pulse waveforms. Pulse generators can also include carrier-generation circuits, systems, software, etc. having some carrier-weighting apparatus or algorithm (e.g., CI coder, phase shifter, delay device, mode-locking system, etc.) adapted to produce a plurality of carriers having complex weights that shape a superposition of the carriers into one or more pulse waveforms. Since there are many techniques for generating CI waveforms, the invention is not limited to any specific embodiment for generating CI waveforms disclosed herein. Other techniques for generating CI waveforms will be evident to persons skilled in the art.

CI waveforms are typically impressed onto one or more carriers. CI sub-carriers may be impressed onto multiple transmission carrier signals, such as carriers corresponding to different frequency bands. CI waveforms may be conveyed as analog waveforms (such as generated by a D/A converter or a bank of oscillators). CI waveforms may be digital signals (such as a digital output generated by an IDFT or other transform). Digital CI waveforms may be generated from an A/D conversion of at least one analog CI waveform. Digital CI waveforms may be generated by appropriately weighting and summing a predetermined set of digital sinusoids that are dynamically generated or stored in memory. Digital CI waveforms may include binary or M-ary (i.e., higher order) signals. Digital CI signals may be expressed as discreet or continuous modulation symbols, including, but not limited to, QAM, PSK, CPM, FSK, AM, FM, PAM, and TOM. The digital signals may be transmitted in any order.

Various interleaving and/or channel-coding techniques may be employed in the transmission of digital signals associated with CI waveforms. In one aspect of the invention, coding (which is not necessarily limited to channel coding) and/or interleaving are applied to data symbols prior to generating the CI waveforms. In another aspect of the invention, coding and/or interleaving are applied to digitized CI signals. In yet another embodiment, modulation symbols may be interleaved.

The offset frequency $f_o$ represents the carrier frequency. In some applications, CI waveforms may be conveyed in their baseband form (i.e., a carrier frequency, or offset frequency $f_o$, having zero frequency). For example, baseband CI waveforms may be conveyed inside a digital signal processor or equivalent device, between storage devices (physical and/or virtual memory) and signal-processing devices (e.g., DSPs, microprocessors, CPUs), inside transmitter components, inside receiver components, and/or between transmitter and receiver components. CI waveforms may be conveyed in an intermediate-frequency (IF) form. For example, the multicarrier CI signal may be impressed on an IF carrier. Carriers having other frequencies, including optical, infra-red, and microwave, may be employed.

Complex sub-carrier weights convey phase space (e.g., CI codes, phase-shift sets, carrier delays, pulse (time-) offset, or any other interpretation of carrier superposition signals resulting from carrier phase alignments at predetermined times) and information (e.g., data symbol) values. Complex sub-carrier weights may be generated from a product of a vector or matrix of data symbols with a vector or matrix of phase space (i.e., CI code) values. Complex sub-carrier weights may be generated from sums of information-modulated phase spaces. Complex sub-carrier weights may be generated from a sum of products of each of a plurality of phase-shift sets corresponding to a particular phase space with data symbols corresponding to that particular phase space. Carrier weights may be generated by calculating or measuring sub-carrier amplitudes and phases resulting from combining a plurality of information-modulated, time-offset pulse waveforms.

The invention is not limited any particular embodiment for generating, calculating, measuring, retrieving from memory, or otherwise obtaining the complex sub-carrier weights associated with CI. One skilled in the art will recognize that there are many additional methods for providing sub-carrier weights. Sub-carrier weights may optionally include channel compensation weights, array-processing weights, and/or coding (e.g., channel coding, multiple-access coding, spread-spectrum coding, etc.). The sub-carrier weights may optionally provide for data interleaving.

In some aspects of the invention, sub-carrier weights may be provided with at least one code (e.g., a complex-valued or real code) adapted to de-orthogonalize (e.g., provide time-domain spreading, and thus, overlapping of) the transmitted pulses. Upon reception, an appropriate derivative of the code (e.g., a complex-conjugate code) can be applied to the appropriate frequency-domain components to re-orthogonalize the pulse waveforms. Such codes are typically intended to provide for encryption or signal masking in the time domain. However, alternative or additional uses may be provided, including multiple access, channel compensation, PAPR reduction, authentication, etc.

The function of the sub-carrier weights, whether generated directly or by some indirect means (e.g., providing a plurality of time-offset pulse waveforms that are each modulated with a data symbol), is to map each of a plurality of information signals (e.g., data symbols) to a plurality of orthogonal or pseudo-orthogonal phase spaces. The resulting sequence of signals conveys data symbols, each modulated on the same set of subcarriers, but provided with the appearance of time-division multiplexing.

Practical applications of the invention include providing frequency diversity (and/or enabling frequency-domain processing) to the transmitted data, which improves performance. Measured performance improvements include reduced BER, packet-error rate, probability of error, signal distortion, and/or required transmit power. Similarly, performance improvements may translate into higher SNR, higher CNR, enhanced interference mitigation, improved synchronization, and/or longer range. Other measurements and metrics may be employed to characterize performance improvements. CI signaling (e.g., CI coding) may be employed for spread spectrum wherein the resulting processing gain is proportional to the number of carriers on which each data symbol is spread. Another practical application of the invention includes enabling backwards compatibility with single-carrier communications, such as TDMA, DS-CDMA, and FHSS.

Some implementations of CI processing can simplify transceiver designs, such as by eliminating or reducing the need for various components, including RAKE receivers, time-domain equalizers, and high-dynamic-range amplifiers. In single-carrier applications, CI provides a steeper spectral roll off, thus enhancing spectral efficiency. The parallel-processing nature of some CI implementations can also provide benefits (e.g., low speed/low complexity). The complex carrier weights employed in CI coding provide a noise-like, Gaussian distribution of frequency-domain symbols, thus, providing for enhanced transmission security. Low PAPR is also a consequential benefit of CI coding, which serves to reduce distortion when transmitted signals are amplified by non-linear amplifiers. Transmission signals having low PAPR also enable the use of power amplifiers having low dynamic range.

Figure 9C:
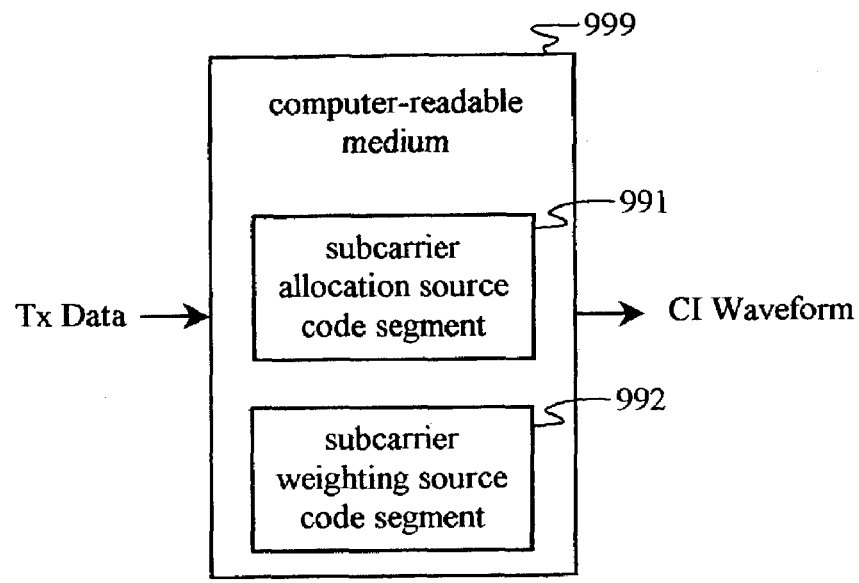
FIG. 9C illustrates basic components of CI signal generation software residing on a computer-readable medium.

FIG. 9C illustrates basic components of CI signal generation software residing on a computer-readable medium 999. CI signal generation software is typically configured to control the function and transmission-signal output of a single carrier or multi-carrier transmitter. In some cases, a CI transmission may be characterized as a single-carrier signal in the time domain having a plurality of predetermined frequency-domain (or spectral) components.

A subcarrier allocation source code segment 991 is adapted to generate a plurality of subcarriers allocated to at least one user or allocate a plurality of input subcarriers (not shown) to a particular user. A subcarrier weighting source code segment 992 is adapted to provide complex weights (e.g., CI codes) to a plurality of the allocated subcarriers. The weights are configured to map one or more input data symbols into one or more phase spaces.

The computer-readable medium 999 may include any item of manufacture adapted to store or convey software and/or firmware. The source-code segments 991 and 992 may reside on a physical memory storage device, such as any magnetic, electrical, or optical device adapted to store data and/or computer command instructions. The source-code segments 991 and 992 may be implemented as gate configurations on a programmable or integrated circuit. Other means for arranging physical devices and/or electromagnetic phenomena may be employed to convey the function of the source-code segments 991 and 992. Accordingly, the computer-readable medium 999 may include any combination of FPGAs, ASICs, transient memory, and persistent memory.

Subcarrier allocation may include generating subcarriers, providing for receiving input subcarriers, retrieving subcarriers or superposition waveforms from memory (e.g., a look-up table), or selecting non-zero (or equivalently, zero) valued input bin weights of an invertible transform, such as a DFT. In some applications, subcarrier allocation can include pulse shaping, controlling symbol durations, and/or selecting subcarrier frequency spacing. Some frequencies may be selected or avoided relative to channel conditions, bandwidth requirements, and/or interference.

The subcarrier allocation source code segment 991 and subcarrier weighting source code segment 992 may be implemented in one program. Similarly, other processing operations typically performed in a communication system transmitter may be implemented in, or in addition to, the source-code segments 991 and 992. It should be appreciated that subcarrier allocation, selection, and assignment can include providing subcarriers for system control and/or monitoring. Subcarrier allocation, as described throughout the specification may include providing for pilot tones, training sequences, and/or other subcarriers allocated to other system-control functions. Sub-carrier weighting may include channel coding, source coding, spread-spectrum coding, formatting, multiple-access coding, multiplexing, encryption, array processing, and/or modulation. Systems and methods illustrated herein and described throughout the specification may be implemented as source-code segments residing on one or more computer-readable mediums.

Network control in CI communications may be adapted to enable users to share network resources (e.g., bandwidth). For example, channel resources in the form of phase spaces and/or subcarriers may be allocated to each user relative to their level of service. Bandwidth may be allocated to users relative to any combination of individual throughput requirements, purchased level of service, and availability of bandwidth. Circuit-switched processes may be implemented with respect to sub-carrier allocations. Packet-switched processes may be implemented with respect to phase spaces. CI communications provides for the concurrent implementation of circuit switching and packet switching.

Figure 10:
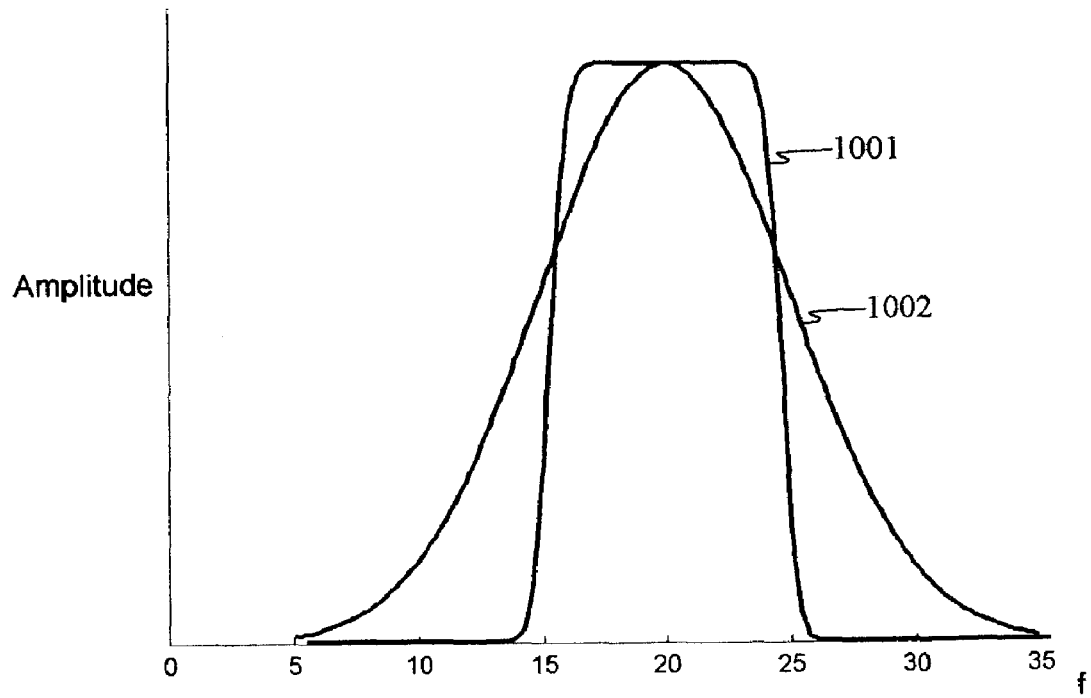
FIG. 10 is a frequency-domain plot illustrating spectral characteristics of a Gaussian-shaped pulse and a CI pulse (generated from 10 subcarriers) having equal time-domain pulse widths.

FIG. 10 is a frequency-domain plot illustrating spectral characteristics of a Gaussian-shaped pulse 1001 and a CI pulse 1002 generated from a superposition of N=10 carriers. The Gaussian and CI pulses 1001 and 1002 have equal pulse widths in the time domain. The spectrum of the time-domain Gaussian pulse 1001 has a Gaussian shape. The CI-pulse spectrum is characterized by 10 contiguous sinc functions. For a fixed pulse bandwidth, the symbol duration $T_s$ is proportional to the number N of carriers (i.e., the inverse of the frequency separation $f_s$). This enables the spectral roll-off of each CI pulse to be particularly steep. The spectral roll-off is steeper for larger numbers of carriers N and thus, longer symbol durations.

Steep spectral roll-offs enabled by CI pulse shaping can significantly enhance spectrum efficiency and enable higher transmit powers for systems having strict limits on out-of-band interference. For example, the out-of-band power spectral density is specified by the IEEE 802.11 US and international standard to be attenuated at least 30 dB at 11 MHz away from the carrier frequency for an 11M-chip/sec system. A steeper spectral roll-off allows higher in-band power for given out-of-band power limitations, thus increasing range, reducing probability of error, and mitigating the effects of interference and fading. Furthermore, any conventional filtering or pulse-shaping techniques that can be applied to time-domain pulses can also be provided to CI carrier components.

Figure 11A:
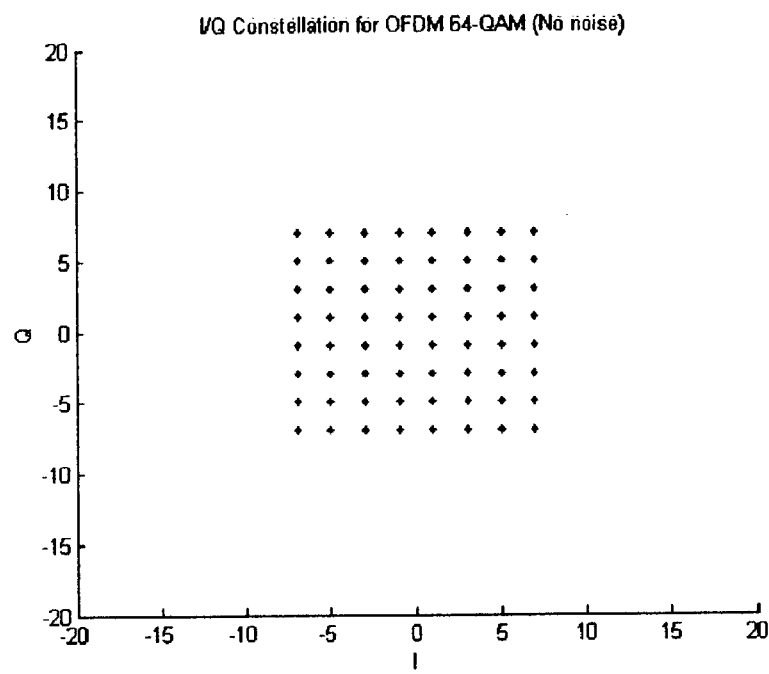
FIG. 11A shows a 64-QAM constellation of data symbols in conventional coded-OFDM.
Figure 11B:
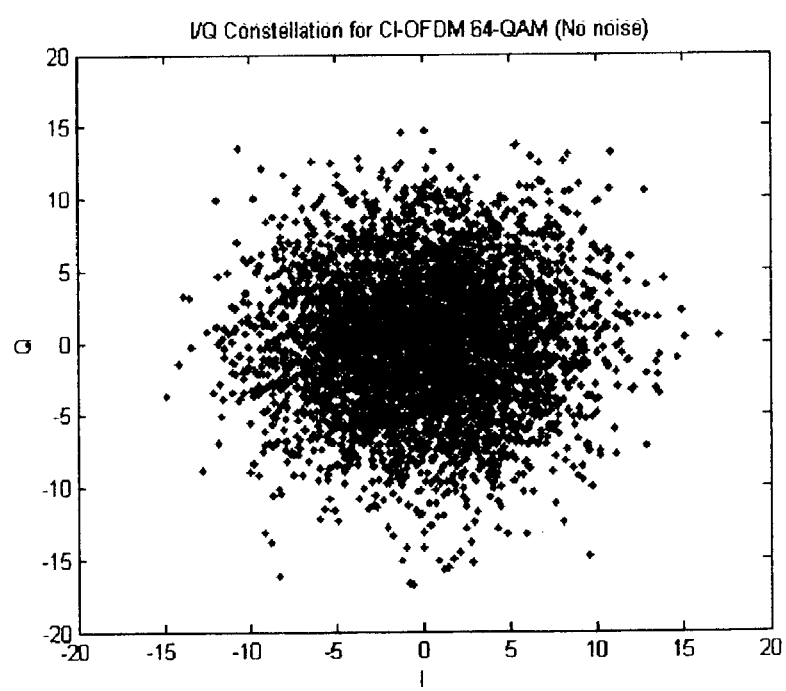
FIG. 11B shows a CI-coded constellation of the same 64-QAM data shown in FIG. 11A.

FIG. 11A illustrates a 64-QAM constellation of data symbols transmitted by a conventional coded-OFDM system. FIG. 11B illustrates a CI-coded constellation of the same 64-QAM data shown in FIG. 11A. CI coding provides a Gaussian (i.e., noise-like) mapping to the data symbols, making it statistically identical to additive white Gaussian noise. Similar noise-like constellations are generated for other data constellations, including BPSK.

Wireless systems face substantial security challenges because data is transmitted over an open medium. Thus, information-bearing radio signals can be detected and intercepted by unauthorized wireless devices located in a potentially large geographical area. CI protects user and system data from eavesdropping and corruption. CI coding can be an integral part of a complete security architecture including authentication, encryption, and integrity functions. CI coding may be employed in key management, which establishes, distributes, and maintains authenticity certificates and keys. Key management for the system is typically performed by a backend security server, which stores device and user information, and aids in the authentication task.

The link layer protocol may specify an authentication protocol by which the identity of the communication device(s) is verified. Encryption keys are typically linked to the authentication phase. Typically, a wireless device needs to prove its identity in order to obtain network access. Similarly, the wireless device can verify that the access node through which it desires to communicate is legitimate. The link layer may specify an encryption algorithm for user data and/or control data. In packet-based networks, encryption is typically applied to link-layer frames over the air link. A CI code key algorithm may be used. CI codes are complementary codes, meaning that the complex conjugate of the key used to encrypt data is used to decrypt data. CI may also be referred to as a symmetric code, since a common code is used as the basis for both encryption and decryption. The encryption algorithm should not be computationally complex because wireless devices have significant power and processing constraints. Consequently, CI encryption may be embedded in multiplexing, multiple access, and/or spread-spectrum algorithms already performed by the system.

CI further reduces probability of detection and interception by providing for high processing gains, spreading over non-contiguous frequency bands, low PAPR, and low transmission power due to efficient frequency-domain combining at the receiver. Implementations of CI in multi-antenna processing, such as spatial beam sweeping or space-frequency processing (e.g., spatial interferometry multiplexing), further reduce the possibility of unauthorized detection. In some cases, channel-fading parameters, such as associated with certain frequencies or sub-space channels may be employed for user identification and authentication.

Figure 12A:
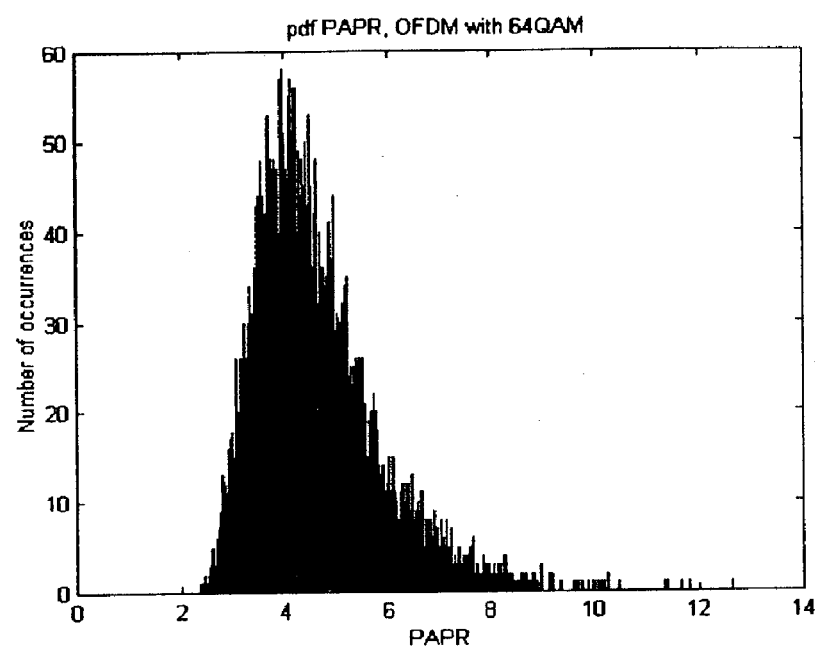
FIG. 12A illustrates a probability density function of PAPR for conventional coded OFDM with a 64-QAM constellation.
Figure 12B:
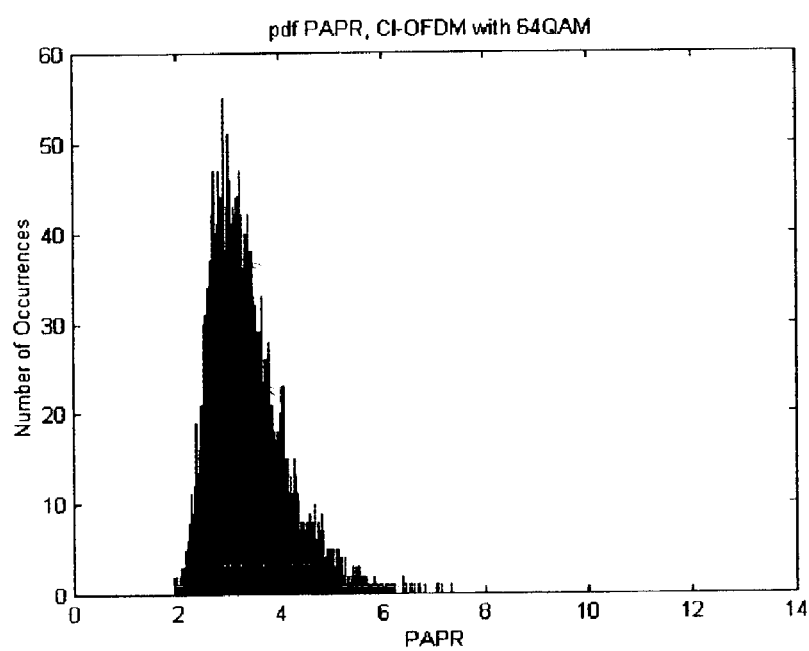
FIG. 12B shows a probability density function of PAPR for CI-OFDM with a 64-QAM constellation.

FIG. 12A illustrates a probability density function of PAPR for conventional coded OFDM with a 64-QAM constellation. FIG. 12B shows a probability density function of PAPR for CI-OFDM with the same 64-QAM constellation.

Figure 13A:
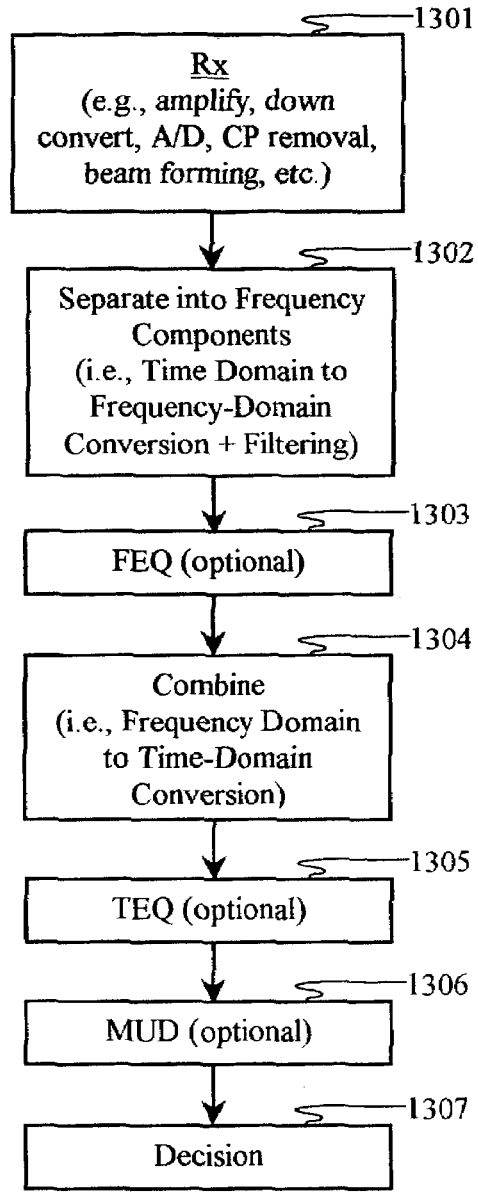
FIG. 13A is a functional flow chart of a CI receiver.

FIG. 13A is a functional flow chart of a CI receiver, such as described in PCT Appl. No. PCT/US99/02838. A receiver process 1301 couples at least one transmitted signal from a communication channel and converts it to an IF or baseband signal. Multi-carrier receivers are well known in the art, and they typically include various combinations of signal-processing components, such as amplifiers, filters, down converters, A/D converters, cyclic prefix removers, beam forming circuits, as well as other components. The receiver process 1301 may generate analog or digital signals.

A filtering process 1302 performs a time-domain to frequency-domain conversion of the received signal to produce a plurality of frequency-domain components. Filtering may remove one or more frequency components, or otherwise provide frequency-domain constraints such that the resulting frequency-domain components correspond to components of at least one desired transmit signal. The frequency-domain components may include subcarriers or complex weights corresponding to the magnitude and phase of each subcarrier. Time-domain to frequency-domain processes and frequency-domain to time-domain processes are commonly performed using Fourier transforms or cosine transforms. For example, U.S. Pat. No. 5,815,488 describes the use of Fourier transforms and cosine transforms in OFDM transmitters and receivers.

An optional frequency domain equalization (FEQ) step 1303 may be provided. The FEQ step 1303 typically involves applying complex channel-compensation weights to the frequency-domain components. Time delays may be provided to produce desired phase offsets.

An equalizer, as used herein, is a digital hardware/software apparatus adapted to correct for the inter-symbol interference, fading, and/or other distortions of the received digitally-encoded signals so that the initial data can be recovered. Typically, an equalizer compensates for inter-symbol interference via several processes, such as linear equalization or decision feedback equalization. In linear equalization, the incoming signals are multiplied by the inverse of the inter-symbol interference, generally removing inter-symbol interference from the incoming signals. A drawback of linear equalization is that noise inherent in the data transmission is undesirably simultaneously amplified. Decision feedback equalization avoids the noise amplification problems of linear equalization, but runs the risk of error propagation since any decision errors that are made are fed back. Other types of equalization that may be included in the invention include maximum likelihood sequence estimation, iterative equalization, inter-symbol interference cancellation, and/or turbo equalization.

A combining process 1304 combines the selected frequency-domain components to produce a time-domain signal (e.g., a superposition signal or a sequence of data symbols). Thus, the combining process 1304 is equivalent to other frequency-domain to time-domain conversion processes. Combining 1304 may be followed by an optional time-domain equalization (TEQ) step 1305 and/or an optional multi-user detection (MUD) step 1306. A decision process 1307 is adapted to estimate the received data in order to recover transmitted data symbols. Various types of decision processing 1307 may be employed. An integration step (not shown) is typically provided with combining 1304 and/or decision processing 1307 to combine samples, or otherwise process the received signal, over one or more symbol durations $T_s$.

In PCT Appl. No. PCT/US99/02838, FIG. 7 shows a well known time-domain equalizer known as a transversal filter. In B. Sklar, *Digital Communications*, page 105, line 1 to page 106, line 25, a transversal (i.e., time domain) filter consisting of a delay line with taps spaced at multiple symbol intervals provides a plurality of outputs that are summed and fed to a decision device. Tap coefficients are set to subtract the effects of interference from symbols that are adjacent in time to the desired symbol. In PCT Appl. No. PCT/US99/02838, a similar transversal filter is described on page 7, lines 8-13. In particular, each frequency component is split into a number of delayed components by a plurality of delay elements 60 mn. The delayed components are combined in combiners 62m and then processed in a decision unit 66 that outputs estimates of the transmitted information symbols. On page 8, lines 20-25, the receiver shown in FIG. 7 is adapted to sample signals in neighboring time intervals and combine the signals in the decision unit 66 (which is adapted to perform weight and sum) to cancel interference in the desired signal.

A decision system, as used herein, describes any combination of devices and/or algorithms adapted to process an input signal to provide at least one estimate of the input signal's value. Hard and/or soft decisions may be employed. A decision system may provide for various signal-processing techniques (e.g., decoding, feedback, as well as various adaptive routines), such as are typically associated with receivers and reception techniques. A decision system may employ some reference, such as a reference symbol constellation.

Time domain channel equalizers are well known in the field of multicarrier receivers. For example, time-domain equalizers are shown in N. Al-Dhahir and J. M. Cioffi, "Optimum Finite Length Equalization for Multicarrier Transceivers," *IEEE Trans. on Comm.*, pp. 56-64, January 1996 and in J. S. Chow and J. M. Cioffi, "A cost-effective maximum likelihood receiver for multicarrier systems," *Proc. IEEE Int. Conf. On Comm.*, pp. 948-952, June 1992, which are incorporated by reference.

Figure 13B:
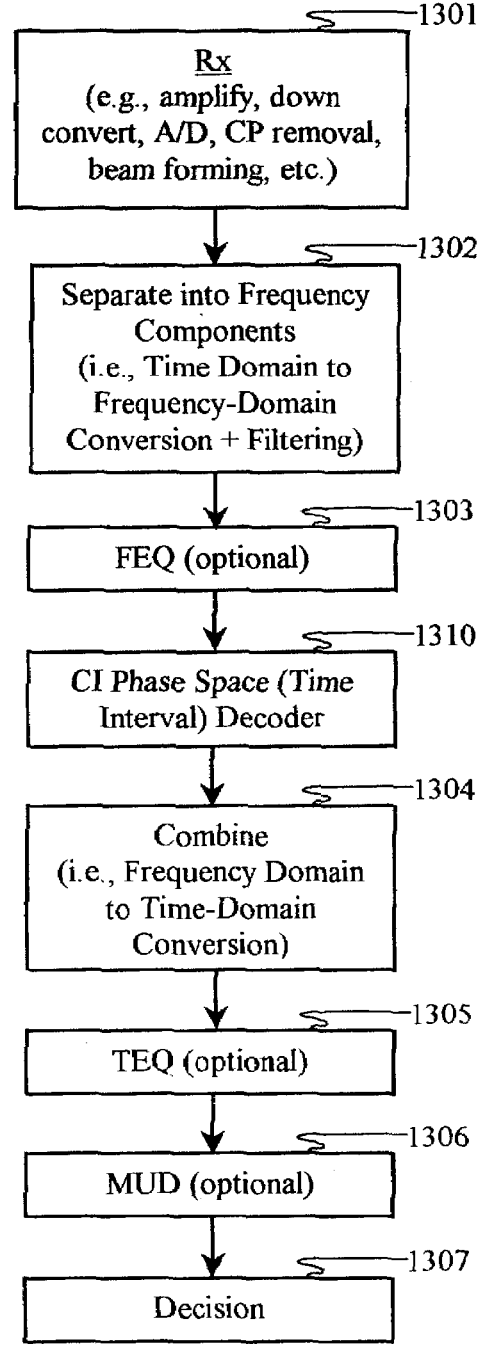
FIG. 13B illustrates a CI receiver method and apparatus including a phase-space decoder.

FIG. 13B illustrates a receiver method and apparatus similar to that shown in FIG. 13A with the addition of a CI phase space decoder step 1310. A plurality of CI phase spaces (i.e., time intervals) can be selected by the same transversal filter described with respect to the TEQ 1305. In this case, data symbols impressed onto different phase spaces are separated by applying the appropriate incremental delays (i.e., phase offsets) to the individual carriers prior to combining 1304. If the components are complex values (e.g., output-bin values of a discreet Fourier transform), a complex conjugate of each CI code used to map a data symbol to a particular phase space may be employed to recover the corresponding mapped symbol.

Figure 13C:
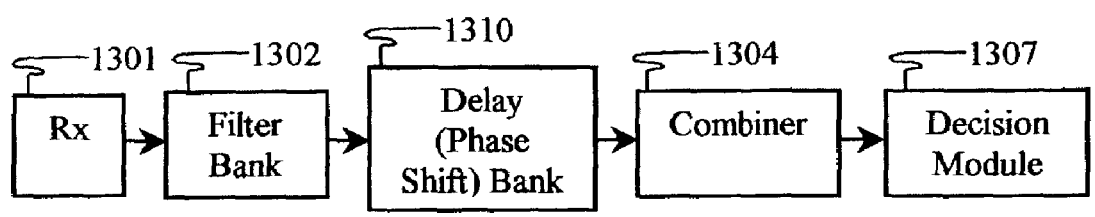
FIG. 13C shows an embodiment of a CI receiver.

FIG. 13C shows an embodiment of a CI receiver that includes a receiving module 1301, a filter bank 1302, a delay system (or phase-shifter bank) 1310, a combiner 1304, and a decision module 1307. Received signals are processed by the receiving module 1301 prior to processing at the filter bank 1302. The filter bank 1302 may include a plurality of filters, such as a plurality of analysis filters. The filter bank 1302 is typically a complementary system with respect to a carrier synthesizer (not shown) employed on the transmit side to generate CI signals. Alternatively, the filter bank 1302 may include a transform operation that is complementary (e.g., inverted) relative to an associated transform function in a corresponding CI transmission process. For example, the filter bank 1302 may be adapted to perform a Fourier transform operation (e.g., a DFT implemented with a fast transform algorithm, such as a fast Fourier transform). Alternatively, the filter bank 1302 may be adapted to perform matched filtering. In any of these cases, the function of the filter bank 1302 is to convert an input time-domain signal into a plurality of frequency-domain components.

The delay system 1310 is adapted to provide incremental delays to a plurality of sub-carrier waveforms generated by the filter bank 1302. Equivalently, the delay system 1310 may provide incremental phase offsets to frequency-bin values or equivalent complex values corresponding to carrier magnitudes and phases. It is well known that there is a linear relationship between carrier time offsets $\tau$ and carrier phase offsets $\phi$ related to a given carrier frequency $f_n$: $\phi = 2\pi f_n \tau$. The delay system 1310 typically provides a complementary or inverse set of delays (or equivalently, phase shifts) to the component waveforms. Accordingly, the delay system 1310 is adapted to provide complementary phase offsets (or time offsets) that are complex conjugates of terms corresponding to each predetermined phase space, such as the phase spaces 911, 912, ..., 919 shown in FIG. 9A.

The combiner 1304 is adapted to combine one or more sets of the delayed (or phase offset) carrier components. Combining may include equalization, such as frequency-domain equalization. Similarly, some form of time-domain equalization and/or multi-user detection may be performed after combining. Consequently, the combiner 1304 may include at least one equalizer (not shown).

The combiner 1304 combines the frequency-domain components to generate a time-domain sequence, such as a reconstructed CI pulse waveform or a sequence of symbol values corresponding to the transmitted data. A CI pulse waveform typically includes a plurality of orthogonally positioned CI pulses (i.e., a pulse train, such as illustrated in FIGS. 2B and 3B) wherein each pulse conveys (e.g., is modulated with) a data symbol. Thus, the combiner 1304 generates signal values from data symbols that were mapped to predetermined instants in time (i.e., phase spaces, or pulse positions centered at equally spaced time instants) by at least one transmitter.

The decision module 1307 processes the signal values to generate estimated data symbols. Methods of formatting information symbols, such as mapping a constellation of data symbols to a constellation of modulation levels, and the reverse operation, are well known in the art and are typically understood to be a process within a symbol-estimation step or decision step. For example, B. Sklar (FIG. 2.2 and page 54, lines 3-22) describes signal formatting in which information symbols are converted to waveform symbols at a transmitter and the reverse conversion is performed at a receiver.

U.S. Pat. No. 5,363,408 describes prior-art techniques for mapping a plurality of data bits into a constellation of modulation levels. U.S. Pat. No. 5,384,810 describes a decoder adapted to perform symbol-to-bit mapping. In U.S. Pat. No. 5,455,839, digital data is mapped into a signal point sequence with respect to a predetermined code. Inverse mapping produces an estimated data sequence from a received signal point sequence. An inverse-mapping device (not shown), which may be part of the decision module 1307 produces an estimated data sequence from a received signal point sequence.

Receivers of the invention may employ channel estimation. Channel estimation in multi-carrier systems is well known in the art and is typically regarded as part of an equalization process. For example, preset equalization (which uses a training sequence) and adaptive equalization (which relies on evaluating received channel errors), such as described in B. Sklar, page 106, lines 1-25, involve direct or indirect channel estimation. In U.S. Pat. No. 5,867,478, a receiver compares received pilot symbols with known pilot symbol values to measure channel response. S. Shattil, C. Nassar, "Array Control Systems for Multicarrier Protocols Using a Frequency-Shifted Feedback Cavity," Proceedings of the 1999 *IEEE Radio and Wireless Conference*, Denver, Colo., Aug. 1-4, 1999, describes transmitting known training symbols on a set of orthogonal carriers to characterize fading on each carrier frequency. A typical equal-gain combining algorithm uses known and/or constant-modulus transmission symbol values to perform equalization. U.S. Pat. No. 5,867,478 describes processing received OFDM signals preceded by performing channel estimation in which pilot symbols are spaced in time and frequency according to the expected rate of channel variation in time and frequency, respectively.

Figure 13D:
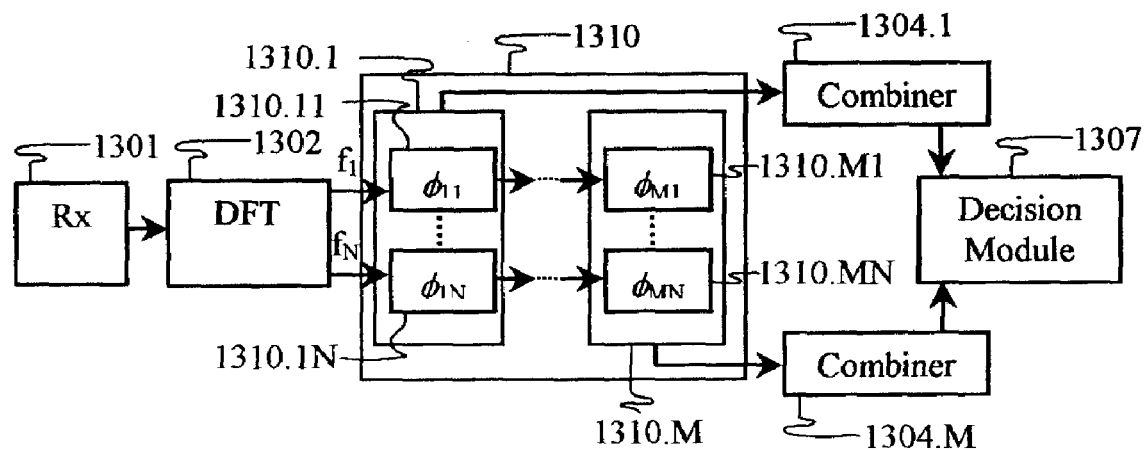
FIG. 13D shows an alternative embodiment of a CI receiver.

FIG. 13D illustrates a specific embodiment of a CI receiver. A DFT 1302 functions as a filter bank. A delay system 1310 is implemented as a plurality M of phase-space modules 1310.1 to 1310.M. Each phase-space module 1310.1 to 1310.M, such as phase-space module 1310.1 is adapted to generate a plurality N of phase offsets 1310.11 to 1310.1N corresponding to a particular phase space. Phase-shifted values or time-offset carriers generated by each phase-space module 1310.1 to 1310.M are coupled to a corresponding combiner of a plurality M of combiners 1304.1 to 1304.M. A decision module 1307 is adapted to process combined symbols or waveforms to generate at least one data estimate. A decision module or a delay system may include at least one decoder (not shown) adapted to perform any necessary decoding, such as channel decoding, multiple-access decoding, demultiplexing, de-spreading, decryption, etc.

Figure 14A:
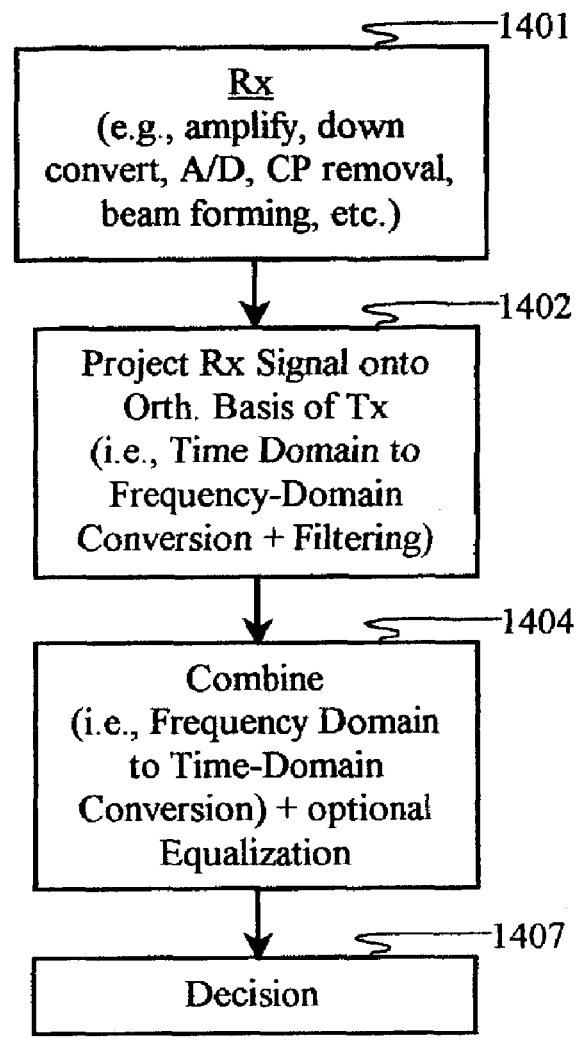
FIG. 14A illustrates an aspect of a CI reception method and apparatus.

FIG. 14A illustrates a CI reception method and functional components of a CI receiver. A receiver module 1401 is adapted to process transmissions from a communication channel to generate one or more received signals for baseband or IF processing. A projection module 1402 is adapted to project the received signals onto at least one orthonormal basis corresponding to at least one user's transmissions. A combining module 1404 is adapted to combine the projections and optionally perform equalization. Combined signals are processed in a decision module 1407 adapted to generate one or more estimated data symbol values.

The receiver function shown in FIG. 14A is substantially identical to the receiver functions illustrated in FIGS. 13A to 13D and described in C. Nassar, B. Natarajan, S. Shattil, "Introduction of Carrier Interference to Spread Spectrum Multiple Access," Proceedings of the *IEEE Emerging Technologies Symposium on Wireless Communications and Systems*, Dallas, Tex., Apr. 12-13, 1999. In particular, the steps of performing time-domain to frequency-domain conversion and filtering the frequency-domain signal is achieved by projecting the received signal onto the orthonormal basis of the transmitted signals (such as indicated by the projection module 1402). Projecting a received multicarrier signal onto an orthonormal basis of a particular user's transmitted signal produces frequency-domain signal components $r = (r_0, r_1, \ldots, r_{N-1})$ corresponding to that user's assigned carriers. Equivalently, the projection of a received signal onto an orthonormal basis excludes signals (e.g., carriers and/or phase spaces) that do not correspond to that orthonormal basis. Similarly, an array of band-pass filters (such as shown in FIG. 13C and described on page 3, column 2, lines 26-29 of C. Nassar, B. Natarajan, S. Shattil, "Introduction of Carrier Interference to Spread Spectrum Multiple Access") performs time-domain to frequency-domain conversion and frequency-domain filtering.

The step of performing frequency-domain to time-domain conversion is achieved by combining 1404 the received frequency-domain components produced by either band-pass filtering or projection onto an orthonormal basis of the transmitted signal. The combined frequency-domain components produce a time-domain signal, such as illustrated in FIGS. 1, 2B, and 3B. The step of recovering symbols is provided in the decision process 1407.

Figure 14B:
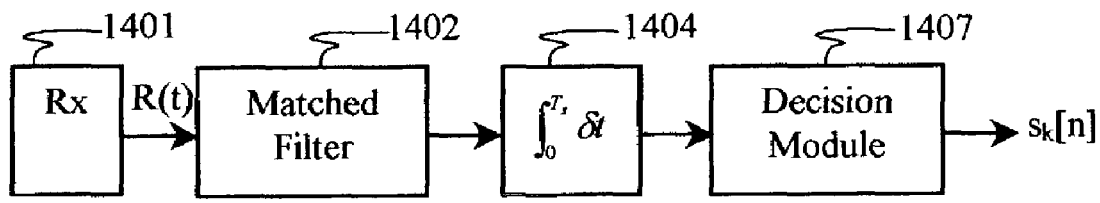
FIG. 14B illustrates a CI receiver method and system of the present invention.

FIG. 14B illustrates a CI receiver method and system of the present invention. A receiver module 1401 is adapted to process and couple one or more transmitted signals from a communication channel to a matched filter 1402. The receiver module 1401 is adapted to perform various types of signal processing (e.g., amplification, filtering, down conversion, A/D conversion, guard-interval removal, beam forming, and/or other types of signal processing) to modify a received signal into an appropriate format for baseband or IF signal processing. The modified signal may include an analog or digital signal.

The matched filter 1402 is typically matched to one or more signal characteristics (e.g., subcarriers, phase spaces, time intervals, codes, etc.) of at least one user or data stream. Different users and/or transmitted data symbols are typically characterized by at least one set of unique diversity parameter values, such as carrier frequencies, phase spaces, time intervals, codes, subspaces, polarizations, or combinations thereof. Other diversity parameters may be used to characterize different users and/or data streams. The matched filter 1402 may include one or more matched-filter elements.

The output(s) of the matched filter 1402 typically characterizes the degree of matching (e.g., correlation) of the filter 1402 with the received signal(s). Measured variations in the degree of matching can indicate the transmitted symbol values. Thus, these measurements may be mapped to a predetermined symbol constellation. The temporal characteristics (e.g., synchronization and duration) of these measurements are typically selected in an integrator 1404. The integrator's 1404 function is typically optimized relative to the probability of error (or BER) of the symbol estimates generated by a decision module 1407.

Integration represents combining in the time domain. Consequently, integration may be part of a combining process (not shown). Frequency-domain combining is typically performed in the matched filter 1402. For example, matching of a particular phase space includes carrier selection, and accordingly, a combining of the appropriately phase-shifted carriers. Alternatively, the matched filter 1402 simply matches components of a signal space corresponding to a particular user or data channel. In this case, the integrator 1404 produces values corresponding to the components over a predetermined time interval, and the decision module 1407 combines the component values to generate symbol estimates. Thus, the matched filter 1402 may employ polyphase codes corresponding to CI phase spaces as part of its matching function. Similarly, the decision module 1407 may employ polyphase CI codes as part of a combining process.

The decision module 1407 may be adapted to perform any of various functions related to data-symbol processing. For example, the decision module 1407 may perform any combination of channel decoding, demodulation, spread-spectrum decoding, de-interleaving, demultiplexing, multiple-access decoding, and formatting. Equalization may be performed by one or more receiver modules 1402, 1404, and/or 1407.

Figure 14C:
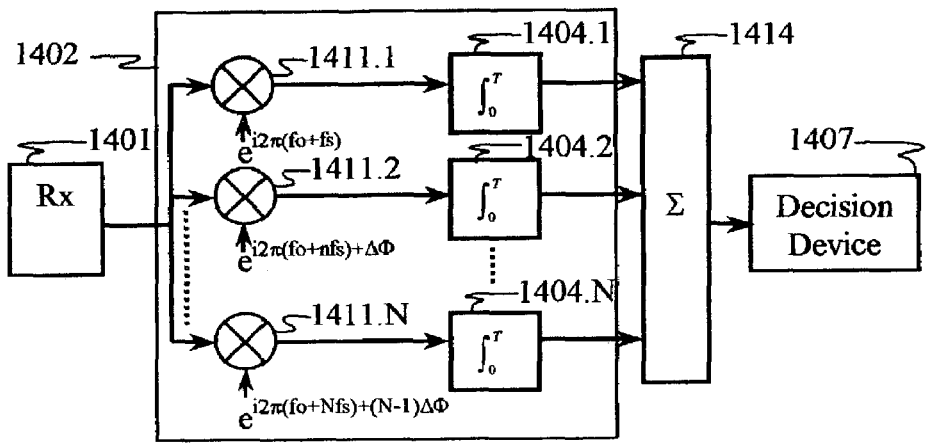
FIG. 14C illustrates a CI receiver apparatus and method of the invention.

FIG. 14C illustrates a CI receiver apparatus and method of the invention. A receiver module or system 1401 is adapted to receive and process at least one transmitted signal to provide a digital or analog time-domain signal to a first software module 1402. The first software module 1402 is adapted to project the received signal onto the orthonormal basis of the transmitted signals. This achieves a combined time-domain to frequency-domain transform and tone filtering.

The first software module 1402 includes a plurality N of multipliers 1411.1 to 1411.N adapted to multiply the received signal by reference signals having orthogonal carrier frequencies $f_n = f_o + nf_s$ (n=0, . . . ,N−1) and at least one predetermined phase relationship $n\Delta\Phi_k$. Software module 1402 also includes a plurality N of integrators 1404.1 to 1401.N adapted to integrate the products over each symbol interval $T_s$. The outputs of the first module 1402 are frequency-domain signal components $r = (r_0, r_1, \ldots, r_{N-1})$ corresponding to a particular user's assigned carriers. The first module 1402 is typically adapted to generate phase offsets $\Delta\Phi$ corresponding to a plurality of phase spaces (i.e., time offsets).

A second software module 1414 takes the form of a combiner, which performs a frequency-domain to time-domain transform. Equalization (not shown) may be performed by either or both first and second modules 1402 and 1414, respectively. Time-domain equalization and/or frequency-domain equalization may be employed. Various combining techniques, such as any appropriate optimal-combining technique may be employed. The combined frequency-domain components produce a time-domain signal, such as shown in FIGS. 1, 2B, and 3B. The time-domain signal may include an analog or digital waveform. Alternatively, a time-domain signal may include a sequence of digital symbol values.

Each set of phase offsets $\Delta\Phi$ corresponds to a particular phase space or time offset. Each received data symbol is characterized by a data-modulated pulse centered at a particular time instant. The inclusion of phase selection in the reference signals used in the multipliers 1411.1 to 1411.N of the first software module 1402 provides for selection of signal values at predetermined instants in time. Thus, the process of combining 1414 the phase-offset signals generated in the first module 1402 is part of a time-instant to symbol-mapping process. Decision processing 1407 provides for estimation of the received data. Decision processing 1407 is a mapping process that maps received signal values corresponding to each pulse (i.e., equally spaced instants in time used to transmit symbol values) into decision variables (i.e., estimated signal values).

Figure 14D:
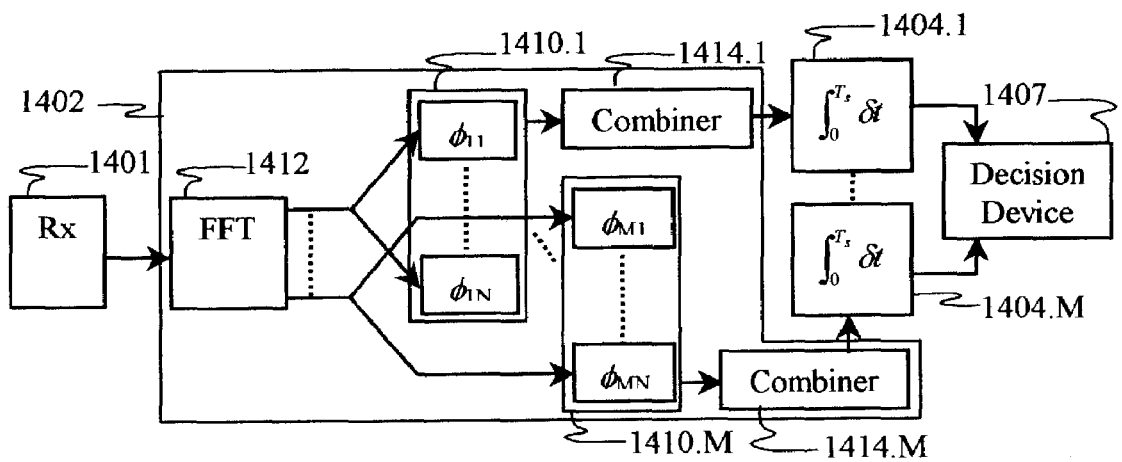
FIG. 14D is a flow diagram for a receiver that receives a CI signal and samples the signal in multiple phase spaces.

FIG. 14D illustrates a CI receiver including a receiver module 1401, a matched filter or projection module 1402, a plurality M of integrators 1404.1 to 1404.M, and a decision device or module 1407. The projection module 1402 includes a discreet Fourier transform, such as an FFT 1412. Equivalently, other types of filters may be included such as to select one or more sub-carrier components allocated to a particular user. N frequency-domain components generated by the FFT 1412 are phase shifted by a plurality M of phase-shift systems (e.g., interval delay systems) 1410.1 to 1410.M. The N signal components corresponding to each phase-shift system 1410.1 to 1410.M are combined in an associated combiner 1414.1 to 1414.M to generate a time-domain signal.

A plurality M of time-domain signals is output from the projection module 1402. Each of the M time-domain signals is integrated over each symbol interval $T_s$ by the integrators 1404.1 to 1404.M. Signal values generated by the integrators 1404.1 to 1404.M are processed by the decision module 1407 to generate a sequence of estimated data symbols.

Various embodiments of the invention may include variations in system configurations and the order of steps in which methods are provided. For example, the order of frequency-domain combining (illustrated by the combiners 1414.1 to 1414.M) and time-domain combining (illustrated by the integrators 1404.1 to 1404.M) may be switched. Multiple steps and/or multiple components may be consolidated.

Figure 14E:
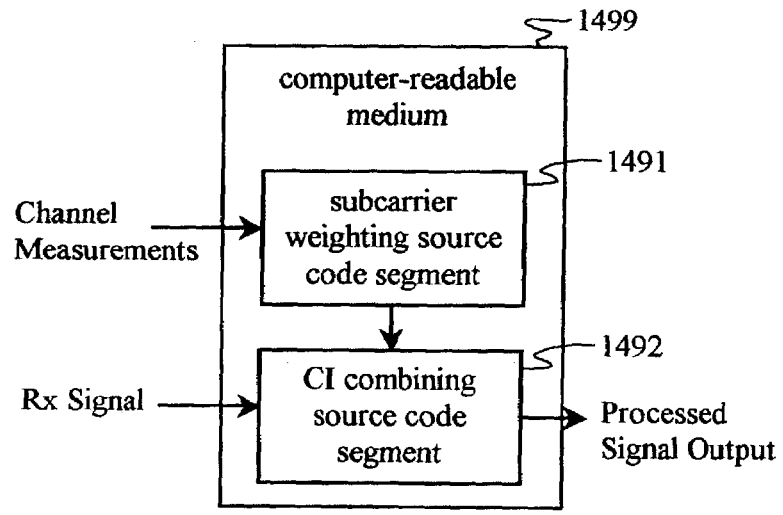
FIG. 14E illustrates basic components of a computer program on a computer-readable medium adapted to control a receiver and optimize performance.

FIG. 14E illustrates a subcarrier weighting source code segment 1491 and a CI combining source code segment 1492 residing on a computer-readable medium 1499. The computer-readable medium is the same type of medium described with respect to medium 999.

Source code segment 1491 is adapted to process one or more received channel measurements (such as frequency-domain or time-domain measurements) for generating a plurality of sub-carrier weights. These weights are adapted to compensate for one or more channel effects, including, but not limited to, multipath, dispersion, and co-channel interference. The weights may be adapted to provide CI decoding. The weights may be adapted relative to one or more channel and/or data-quality measurements. The weights may be configured relative to data-processing measurements, such as hard-decision, soft-decision, and/or iterative feedback decision processing. The weights are typically applied to a plurality of subcarriers, such as frequency components produced by a filter bank or an FFT. Sub-carrier weighting may include filtering, such as providing for acquiring sub-carrier frequencies allocated to at least one predetermined user. Consequently, sub-carrier weights may include both zero and non-zero values. Sub-carrier weighting may include channel decoding, source decoding, spread-spectrum decoding, formatting, multiple-access decoding, demultiplexing, decryption, array processing, and/or modulation.

Source-code segment 1492 is adapted to combine the received and weighted carriers to generate a processed signal output, which is typically a sequence of symbols. At least one type of optimal combining may be provided. Code segment 1492 is adapted to receive as input at least one received signal, such as a sequence of data symbols. The received signal may be impressed onto the weights, weighted subcarriers, or waveforms generated from one or more superpositions of the weighted subcarriers. The weights are configured to map one or more input data symbols into one or more phase spaces. In some applications, data-modulated weights may be generated in source-code segment 1491. In this case, source-code segment 1491 is adapted to process the received signal to generate at least one set of information-bearing weights.

Figure 15:
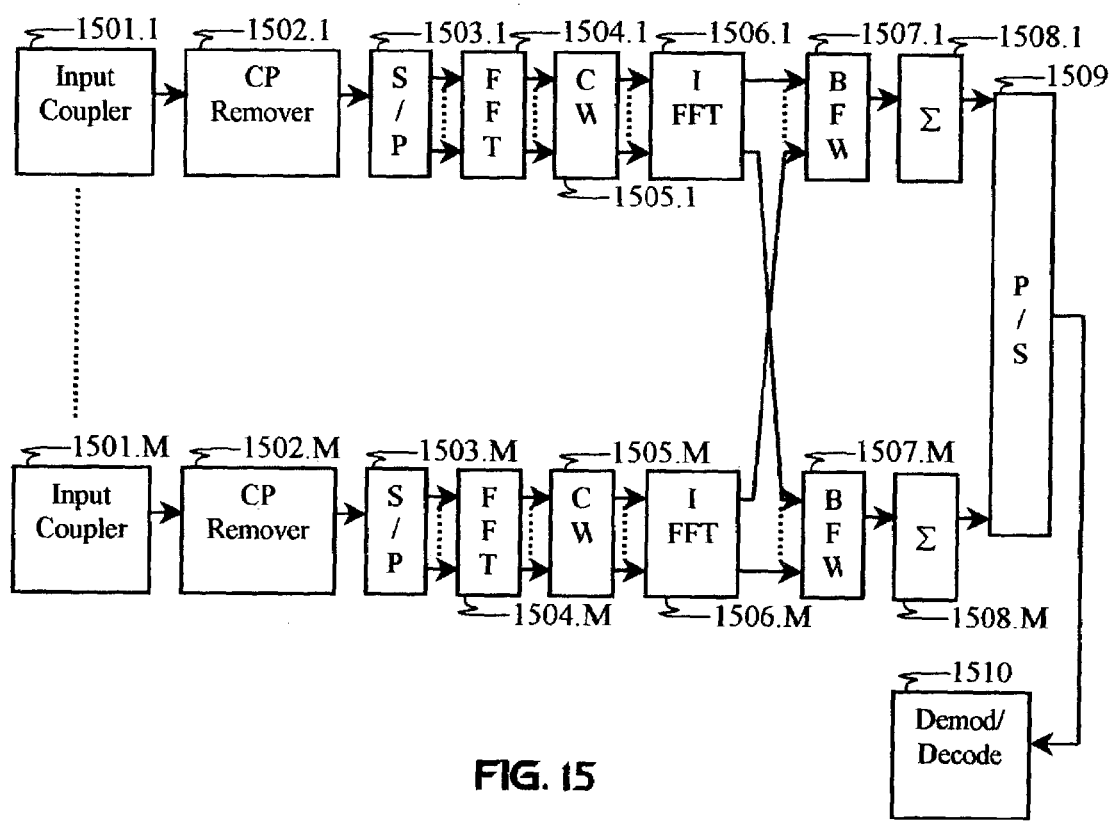
FIG. 15 illustrates a CI receiver configured as a multi-element receiver. Such receiver configurations may be employed in multiple-input, multiple-output (MIMO) communications.

FIG. 15 illustrates a number M of CI receiver branches. A plurality of input couplers (e.g., antenna elements) 1501.1 to 1501.M couple signals from a communications medium (e.g., a free-space channel, a waveguide, etc.) and process the signals. The input couplers 1501.1 to 1501.M are typically adapted to perform any combination of front-end receiver-side processing, including amplification, filtering, frequency conversion, and/or A/D conversion. Other types of processing may be performed. For example, a plurality of optional guard interval (e.g., cyclic prefix) removal circuits 1502.1 to 1502.M may be incorporated in the input couplers 1501.1 to 1501.M. Similarly, each of a plurality M of serial-to-parallel converters 1503.1 to 1503.M may be included in the input couplers 1501.1 to 1501.M or in each of a plurality M of invertible-transform (e.g., FFT) circuits 1504.1 to 1504.M.

Each of the invertible-transform circuits 1504.1 to 1504.M transforms an input time-domain signal into a plurality N of frequency-domain components. The components are weighted with at least one set of CI combining weights $\alpha_m(n)$, where m=1, . . . ,M and n=1, . . . ,N, by a plurality M of component-weighting modules 1505.1 to 1505.M. In the case where MMSE combining is employed, the weights $\alpha_m(n)$ are expressed by:

$$\alpha_m(n)=h_m^*(n)/(N|h_m(n)|^2+\sigma^2)$$

where $h_m(n)$ is the channel response for the $n^{th}$ frequency channel of the $m^{th}$ spatial subchannel, and $\sigma^2$ is the noise power. Other types and combinations of combining may be employed.

A plurality M of combiners, such as IFFTs 1506.1 to 1506.M, combine the weighted frequency-domain components to generate a plurality of time-domain signals. Time-domain outputs of the IFFTs 1506.1 to 1506.M are coupled to beam-forming modules 1507.1 to 1507.M, which are adapted to provide beam-forming weights that cancel co-channel interference in a plurality of combiners 1508.1 to 1508.M. Each combiner 1508.1 to 1508.M may include a summing circuit, an adder, an accumulator, an integrator, or any appropriate invertible transform.

The beam-forming modules 1507.1 to 1507.M and the combiners 1508.1 to 1508.M may be adapted to perform any of various types and combinations of adaptive combining. In some applications, maximal ratio combining may be employed. Other combining schemes may be employed. Combining may include interference cancellation, multi-user detection, null steering, spatial interferometry multiplexing, etc. In some cases, space-time processing may be employed. Successive interference cancellation, as well as other multi-level cancellation techniques, can be used. In other cases, space-frequency processing may be provided. Channel decoding weights may be provided by either or both the component-weighting modules 1505.1 to 1505.M and the beam-forming modules 1507.1 to 1507.M. Symbols output by the combiners 1508.1 to 1508.M are converted to a data stream by a parallel-to-serial converter 1509 prior to being demodulated and decoded 1510.

Variations of the component arrangements may be made. For example, U.S. patent application Ser. No. 09/718,851 filed on Nov. 22, 2000 and U.S. patent application Ser. No. 09/703,202 filed on Oct. 31, 2000 (which are incorporated by reference) describe various CI receiver configurations.

All publications and patent applications mentioned in this specification are herein incorporated by reference to the same extent as if each individual publication or patent application was specifically and individually incorporated by reference.

The method and system embodiments described herein merely illustrate the principles of the invention. It should be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention. This disclosure and its associated references are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry embodying the principles of the invention. Similarly, it should be appreciated that any flow charts, flow diagrams, signal diagrams, system diagrams, codes, and the like represent various processes which may be substantially represented in computer-readable medium and so executed by a computer or processor, whether or not such computer or processor is explicitly shown.

The functions of the various elements shown in the drawings, including functional blocks labeled as "processors" and "modules," may be provided through the use of dedicated hardware as well as hardware capable of executing software in association with appropriate software. When provided by a processor, the functions may be provided by a single dedicated processor, by a shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, the function of many components, steps, and devices described herein may be carried out through the operation of program logic, through dedicated logic, through the interaction of program control and dedicated logic, or even manually, the particular technique being selectable by the implementer as more specifically understood from the context.

Any element expressed herein as adapted to perform a specified function is intended to encompass any way of performing that function including, for example, a combination of circuit elements which performs that function or software in any form, including, therefore, firmware, micro-code or the like, combined with appropriate circuitry for executing that software to perform the function. The invention as defined herein resides in the fact that the functionalities provided by the various recited means are combined and brought together in the manner which the operational descriptions call for. Applicant regards any means which can provide those functionalities as equivalent as those shown herein.

The foregoing discussion and the claims that follow describe the preferred embodiments of the present invention. With respect to the claims, it should be understood that changes can be made without departing from the essence of the invention. To the extent such changes embody the essence of the present invention, each naturally falls within the breadth of protection encompassed by this patent. This is particularly true for the present invention because its basic concepts and understandings are fundamental in nature and can be broadly applied.

The invention claimed is:

1. A transmission system adapted to generate at least one multi-carrier signal, the transmission system including:
   a carrier generator adapted to generate a plurality of orthogonal carrier frequencies allocated to at least one user,
   a data source adapted to impress at least one data symbol onto the carriers,
   a combiner adapted to combine the carriers to generate a time-domain waveform,
   a phase-shift module adapted to provide at least one predetermined set of poly-phase offsets to the carriers for generating at least one Carrier Interferometry (CI) signal, the phase offsets adapted to map each data symbol to a pulse waveform generated from a superposition of the carriers and centered at a predetermined instant in time, and
   an amplitude control system adapted to provide a gain profile to the offset carriers.

2. The transmission according to claim 1, wherein said combiner comprises a transformer to transform the carriers to said time-domain waveform.

3. The transmission system of claim 1, wherein the gain profile is a tapered-amplitude window with respect to a frequency domain.

4. The signal transmitter system of claim 1, wherein the gain profile is compensation for flat fading of the carriers.

5. The signal transmission system of claim 1, wherein the gain profile is pulse-amplitude modulation.

6. A receiver system adapted to process at least one multi-carrier signal, the receiver including:
   a filter bank adapted to separate at least one time-domain signal into a plurality of frequency-domain components,
   a phase-shift circuit adapted to prdvide the frequency-domain components with at least one set of phase offsets wherein each set of phase offsets corresponds to an orthogonal pulse centered at a predetermined instant in time, and
   a combiner adapted to combine the phase offset frequency-domain components to produce at least one time-domain sequence of symbols.

7. The receiver system according to claim 6, wherein said filter bank comprise a Fourier transform component.

8. The receiver according to claim 6, wherein said combiner comprises at least two combiners.

9. A computer-readable medium containing computer program information that, when executed by a processor, cause the processor to implement a method for controlling a multi-carrier generator comprising:
   providing at least one set of subcarriers allocated to at least one user in a network, and
   providing at least one set of complex weights to the at least one set of subcarriers for mapping each of at least one data symbol to at least one carrier-superposition pulse centered at a predetermined instant in time
   providing at least one gain profile to the at least one set of weighted subcarriers.

10. The computer readable-medium of claim 9, wherein the gain profile is a tapered-amplitude window with respect to a frequency domain.

11. The computer readable-medium of claim 9, wherein the gain profile is compensation for flat fading of the carriers.

12. The computer readable-medium of claim 9, wherein the gain profile is pulse-amplitude modulation.

13. A signal transmitter, comprising:
   a subcarrier allocation module configured for allocating a plurality of subcarriers to at least one user in a communications network,
   a mapping module configured for generating a plurality of complex sub-carrier weights to be applied to the subcarriers for generating a plurality of weighted subcarriers, the weights adapted to map each of a plurality of data symbols to at least one of a plurality of pulses generated by a superposition of the plurality of weighted subcarriers, each pulse being centered at a predetermined instant of time, and
   an amplitude control system configured for generating gain profile for each of the plurality of weighted subcarriers.

14. The signal transmitter of claim 13, wherein the gain profile is a tapered-amplitude window with respect to a frequency domain.

15. The signal transmitter of claim 13, wherein the gain profile is compensation for flat fading of the carriers.

16. The signal transmitter of claim 13, wherein the gain profile is pulse-amplitude modulation.

17. A transmission method, comprising:
   allocating a plurality of complex subcarriers to at least one user in a communications network,
   applying a plurality of complex sub-carrier weights to the subearriers to generate a plurality of weighted subcarriers, the weights adapted to map each of a plurality of data symbols to at least one of a plurality of pulses generated by a superposition of the weighted subcarriers, each pulse being centered at a predetermined instant in time, and
   applying a gain profile to each of the plurality of weighted subcarriers.

18. The signal transmission method of claim 17, wherein the gain profile is a tapered-amplitude window with respect to a frequency domain.

19. The signal transmission method of claim 17, wherein the gain profile is compensation for flat fading of the carriers.

20. The signal transmission method of claim 17, wherein the gain profile is pulse-amplitude modulation.

21. A computer-readable medium containing computer program information that, when executed by a processor, causes the processor to implement a method for controlling a multi-carrier receiver comprising:
   receiving at least one channel estimate,
   generating at least one set of complex weights for at least one set of subcarrier components generated from a received signal,
   weighting and applying a gain profile to the at least one set of subcarrier components,
   combining the weighted and gain profiled sub-carrier components to produce a sequence of symbols that conveys at least one transmitted signal value.

22. The computer readable-medium of claim 21, wherein the gain profile is a tapered-amplitude window with respect to a frequency domain.

23. The computer readable-medium of claim 21, wherein the gain profile is compensation for flat fading of the carriers.

24. The computer readable-medium of claim 21, wherein the gain profile is pulse-amplitude modulation.

* * * * *